Feb. 29, 1944. C. A. NERACHER ET AL 2,342,960
POWER TRANSMISSION
Original Filed Jan. 16, 1941 13 Sheets-Sheet 3
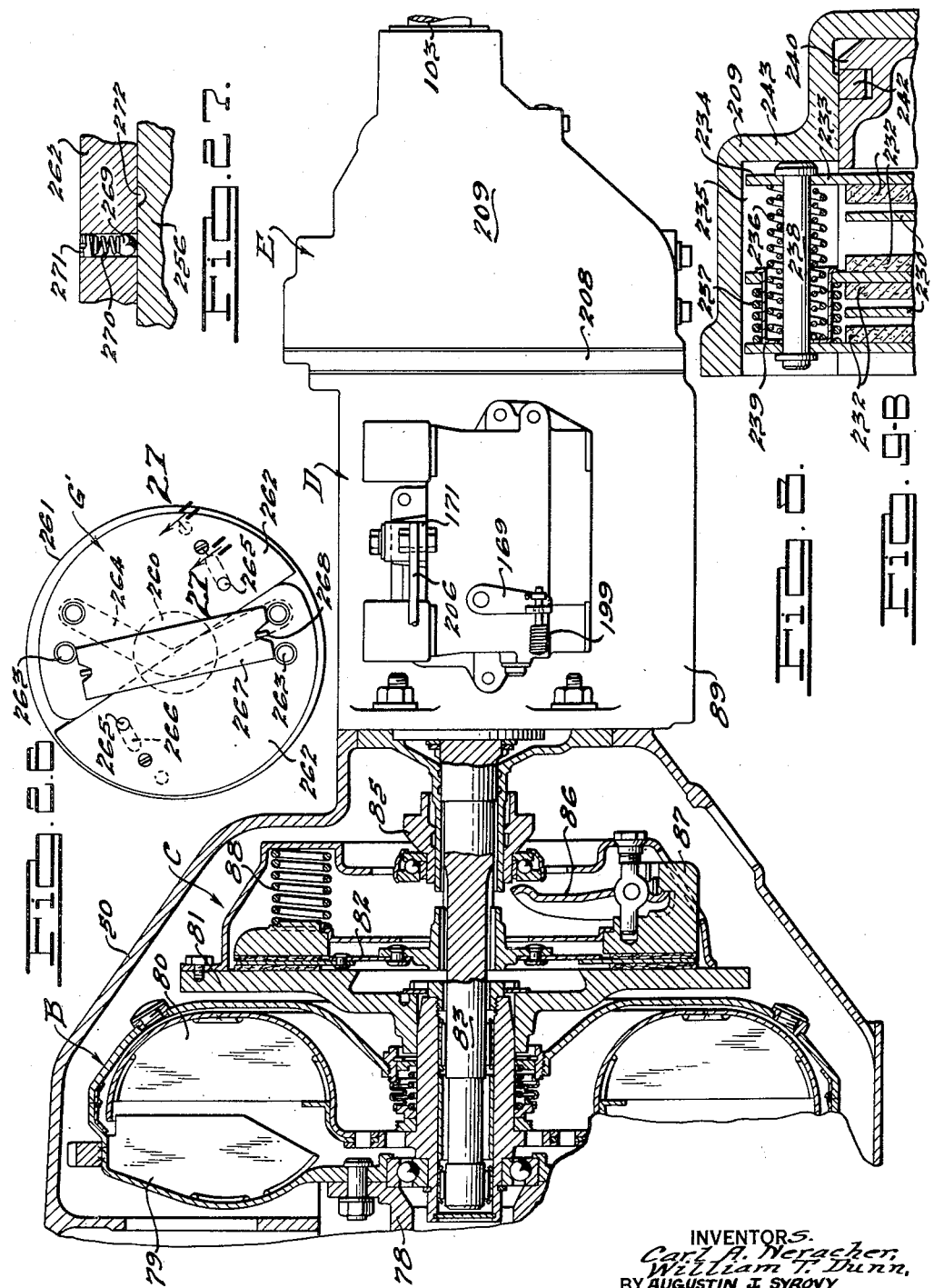
INVENTORS.
Carl A. Neracher,
William T. Dunn,
BY AUGUSTIN J. SYROVY
OTTO W. SCHOTZ.
Harness, Dickey, Pierce & Harris
ATTORNEYS.

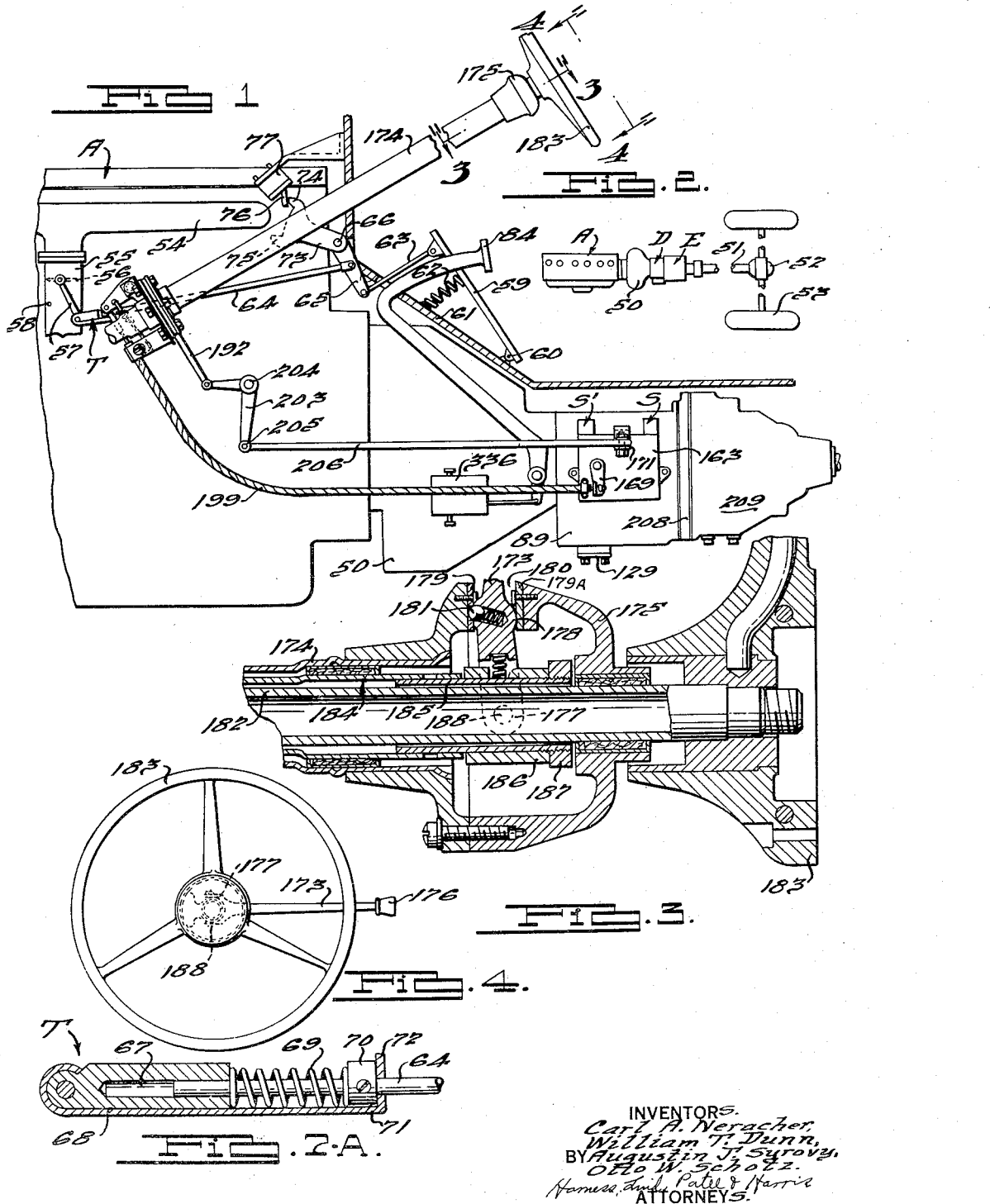
Feb. 29, 1944.   C. A. NERACHER ET AL   2,342,960
POWER TRANSMISSION
Original Filed Jan. 16, 1941   13 Sheets-Sheet 1
INVENTORS.
Carl A. Neracher,
William T. Dunn,
BY Augustin J. Syrovy,
Otto W. Schotz.
ATTORNEYS

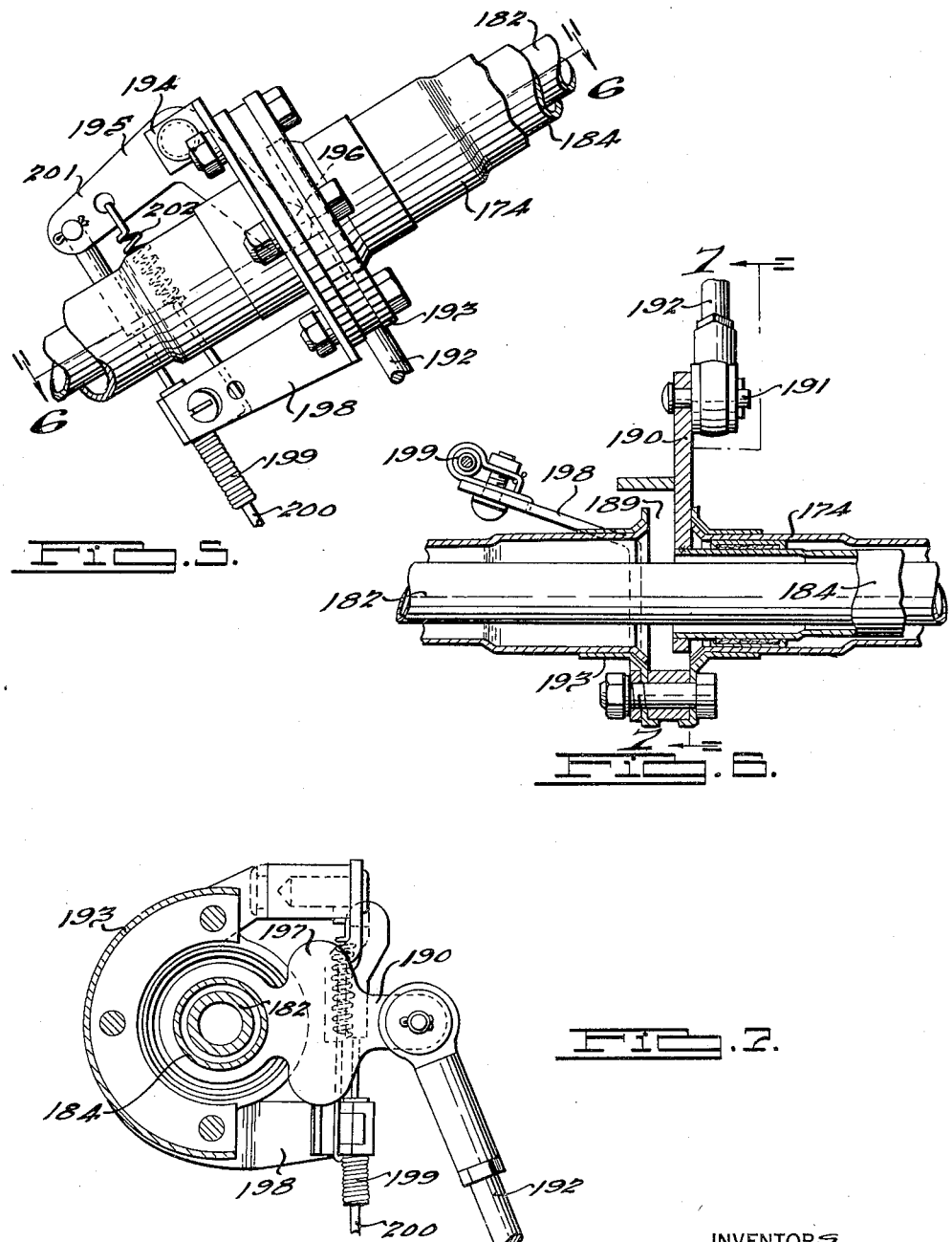

Feb. 29, 1944. C. A. NERACHER ET AL 2,342,960
POWER TRANSMISSION
Original Filed Jan. 16, 1941 13 Sheets-Sheet 4
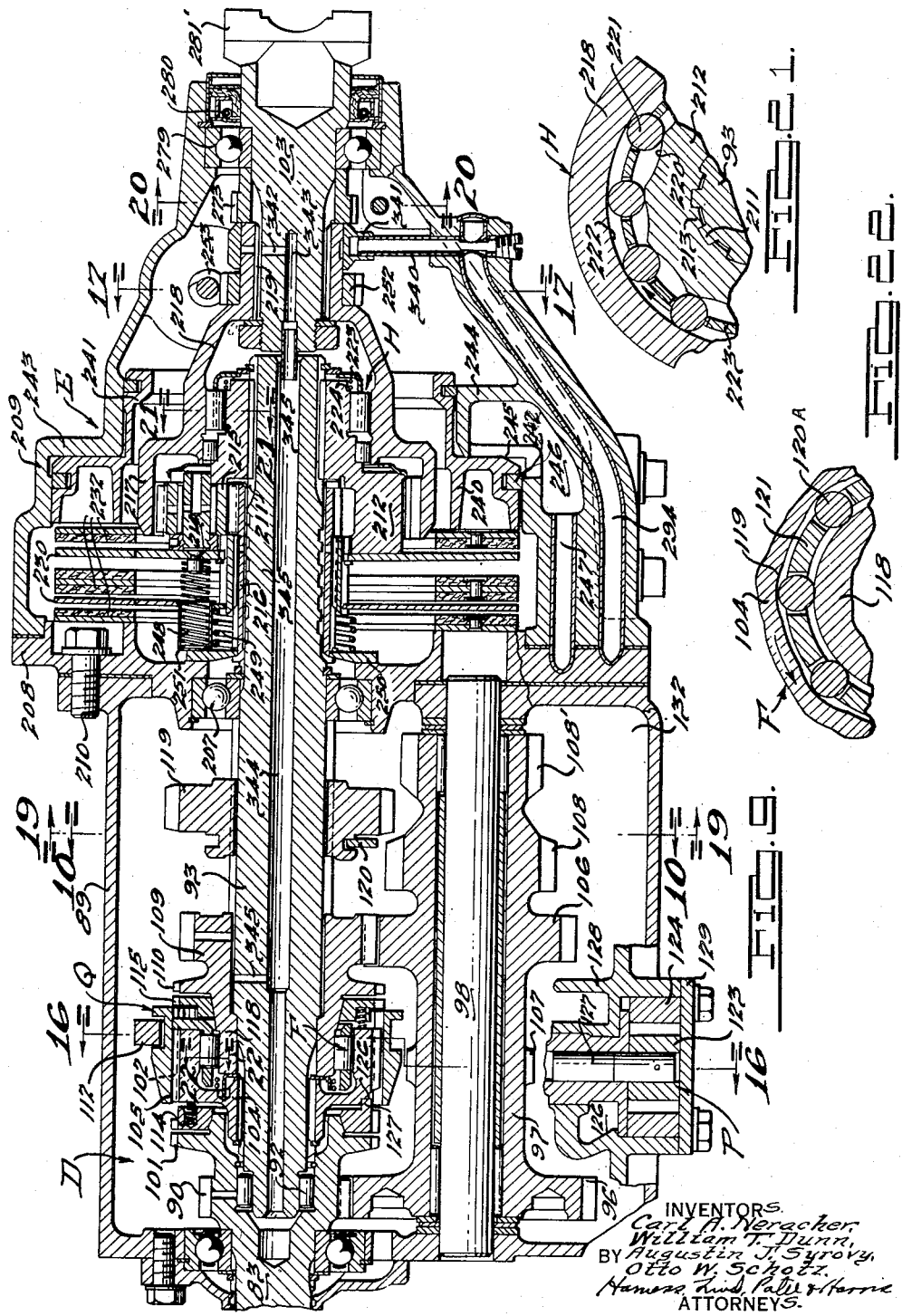
INVENTORS.
Carl A. Neracher,
William T. Dunn,
BY Augustin J. Syrovy,
Otto W. Schotz.
ATTORNEYS.

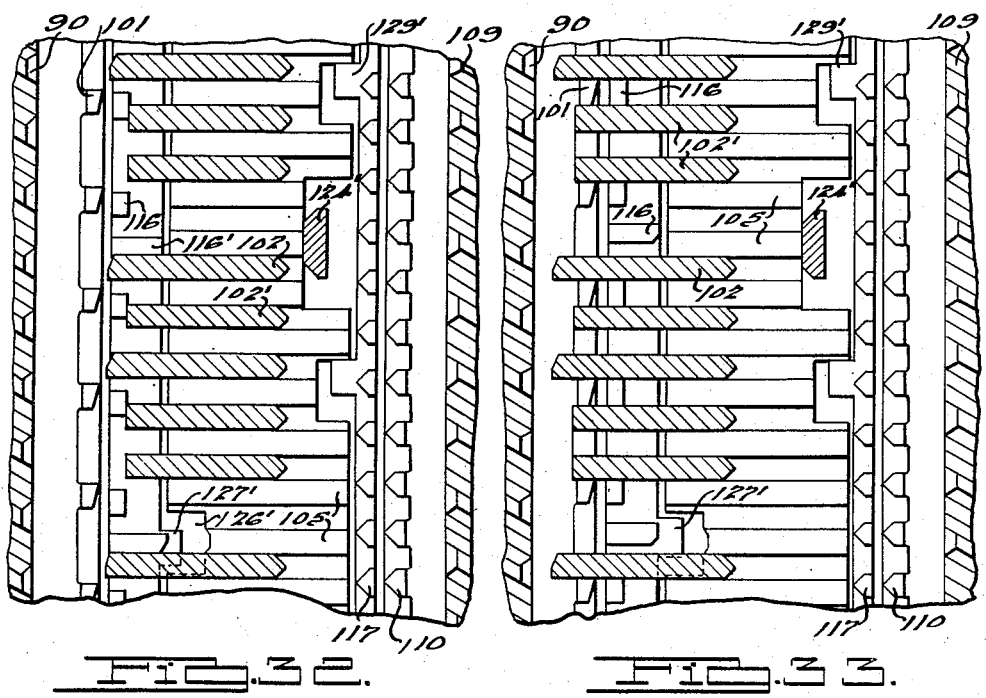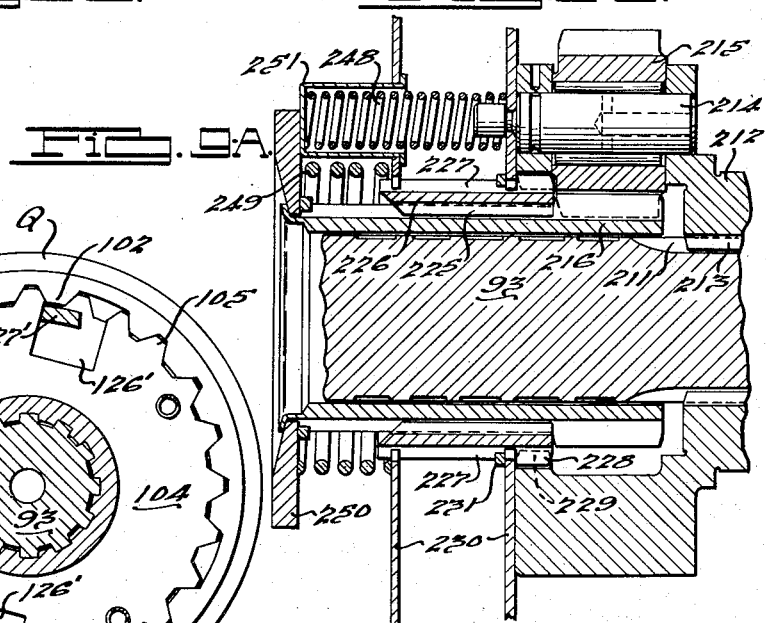

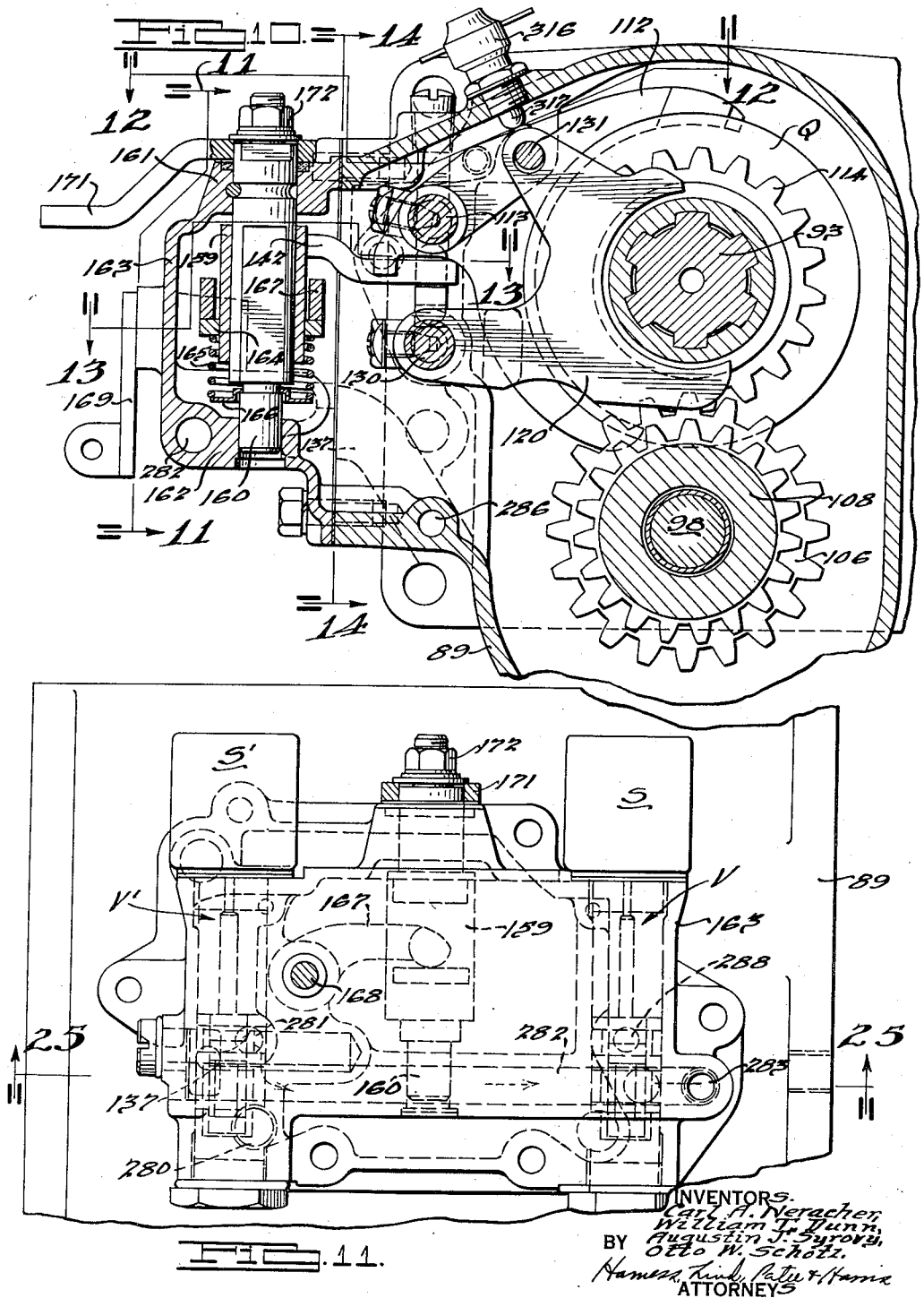

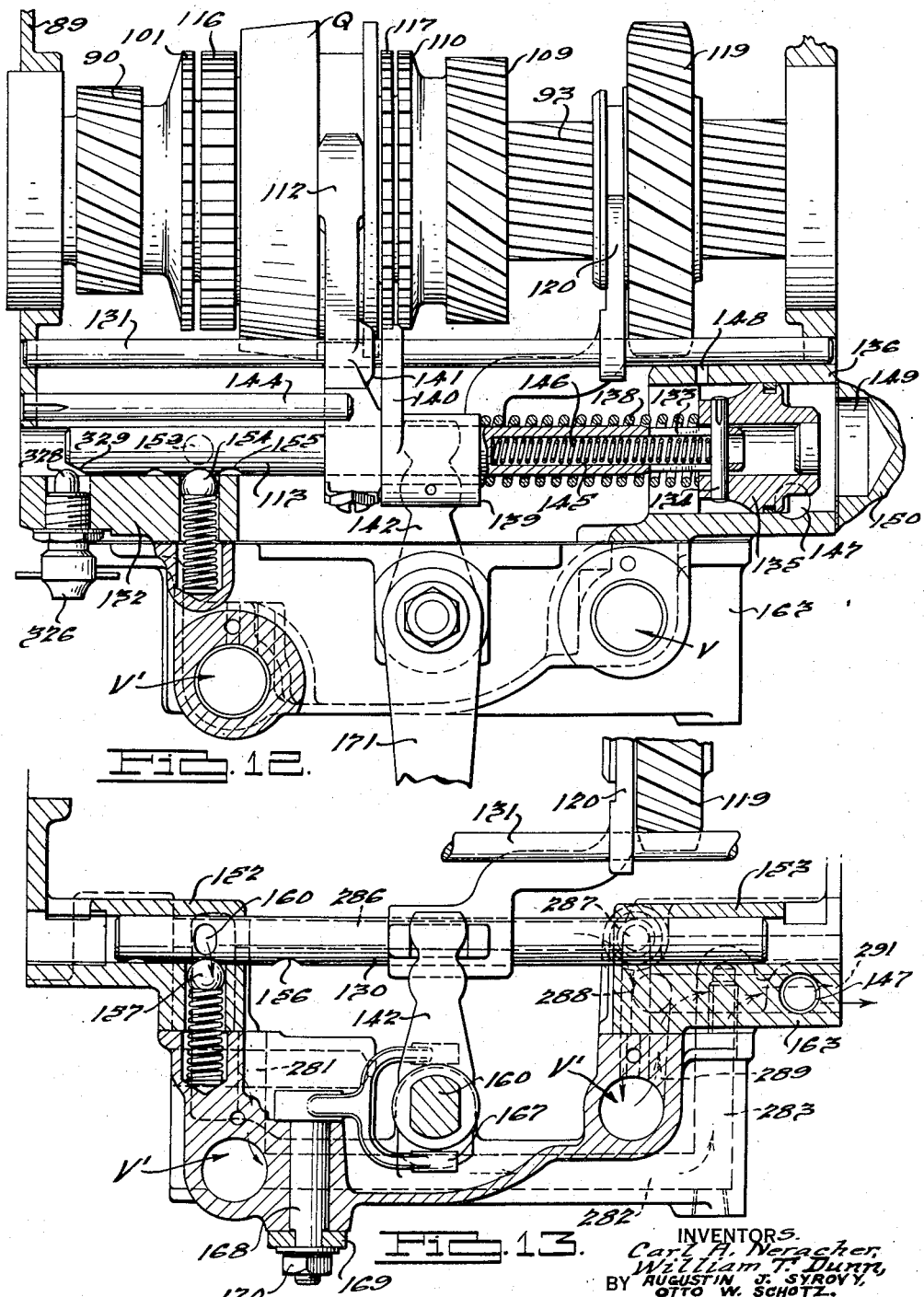

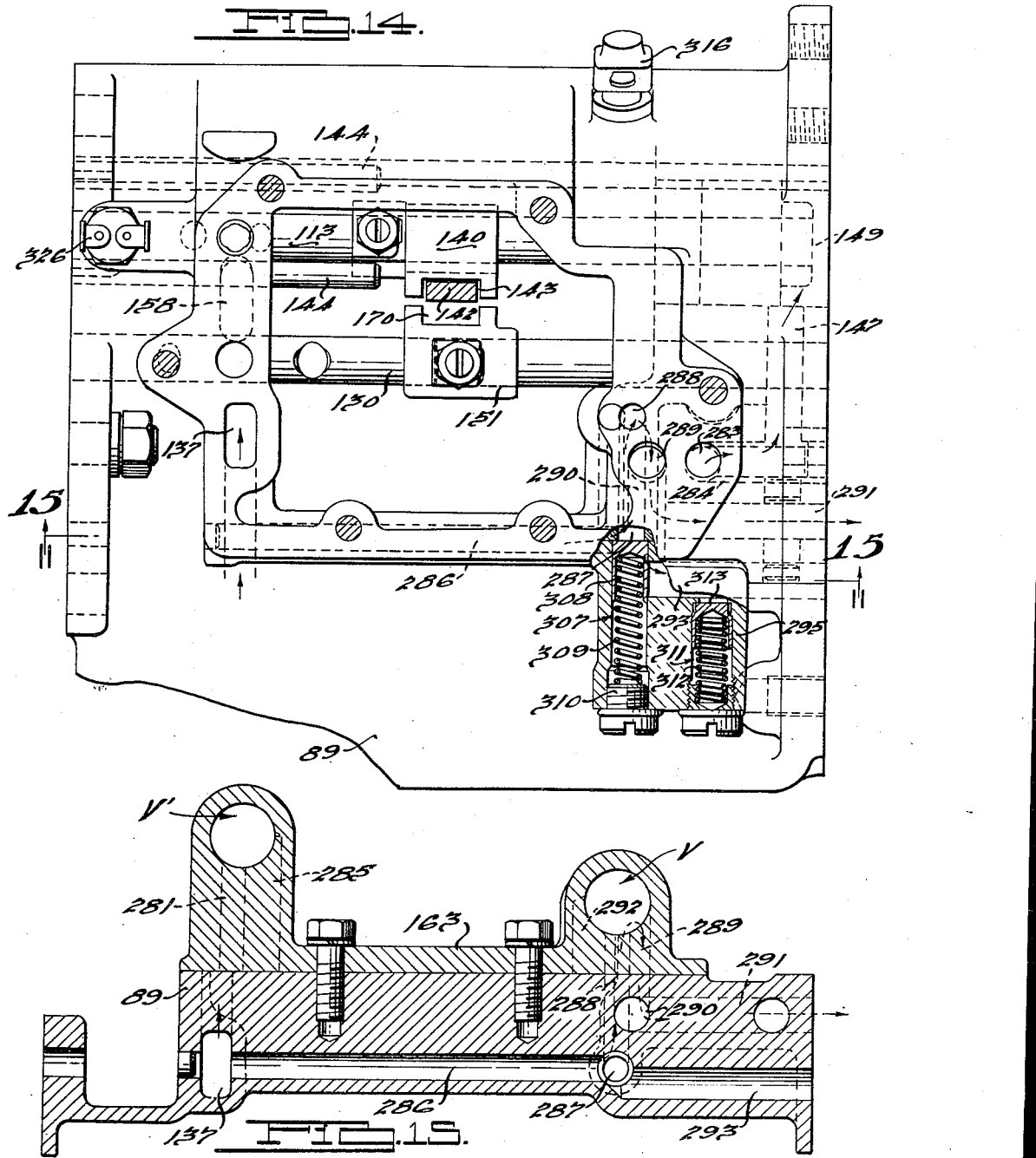

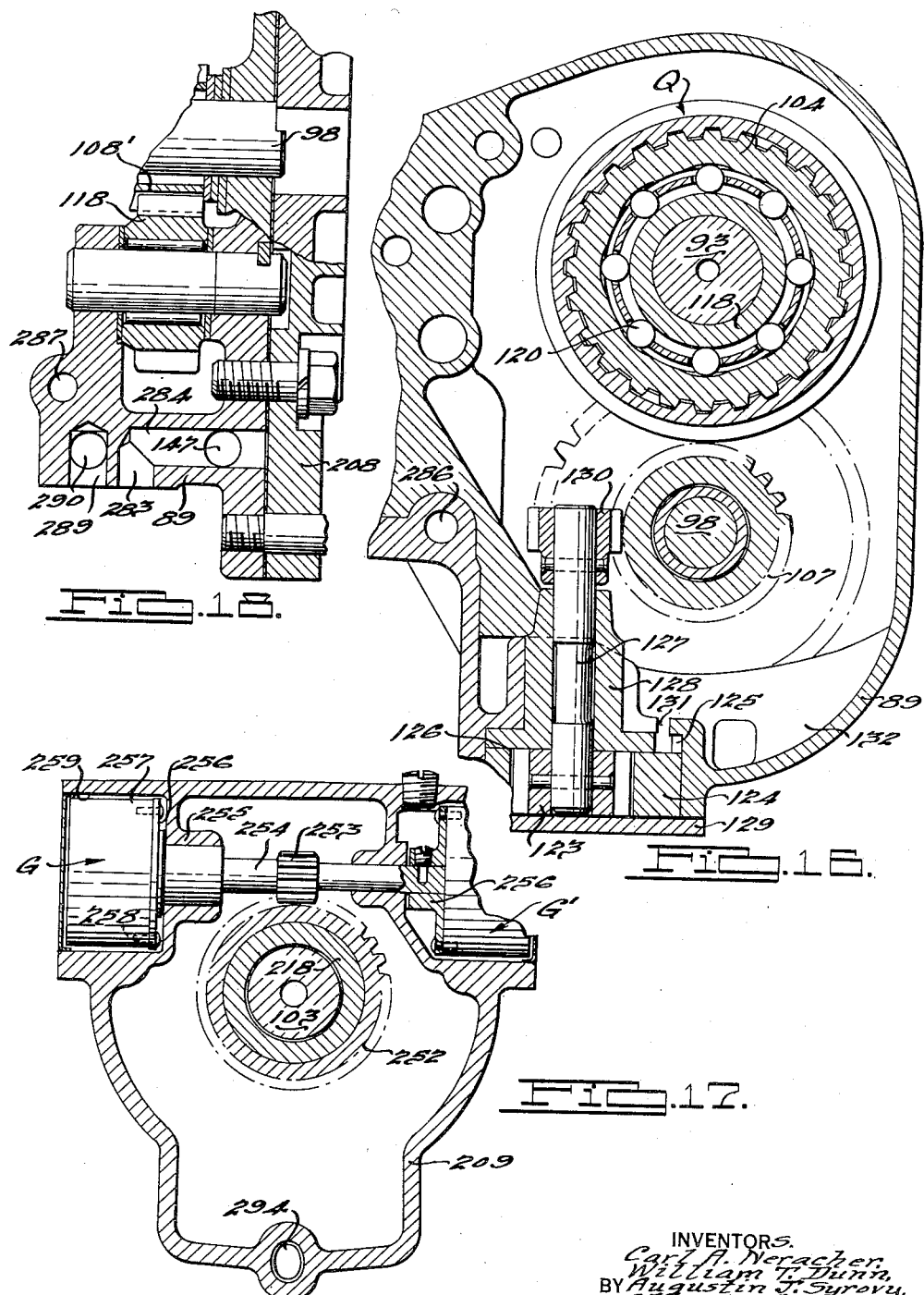

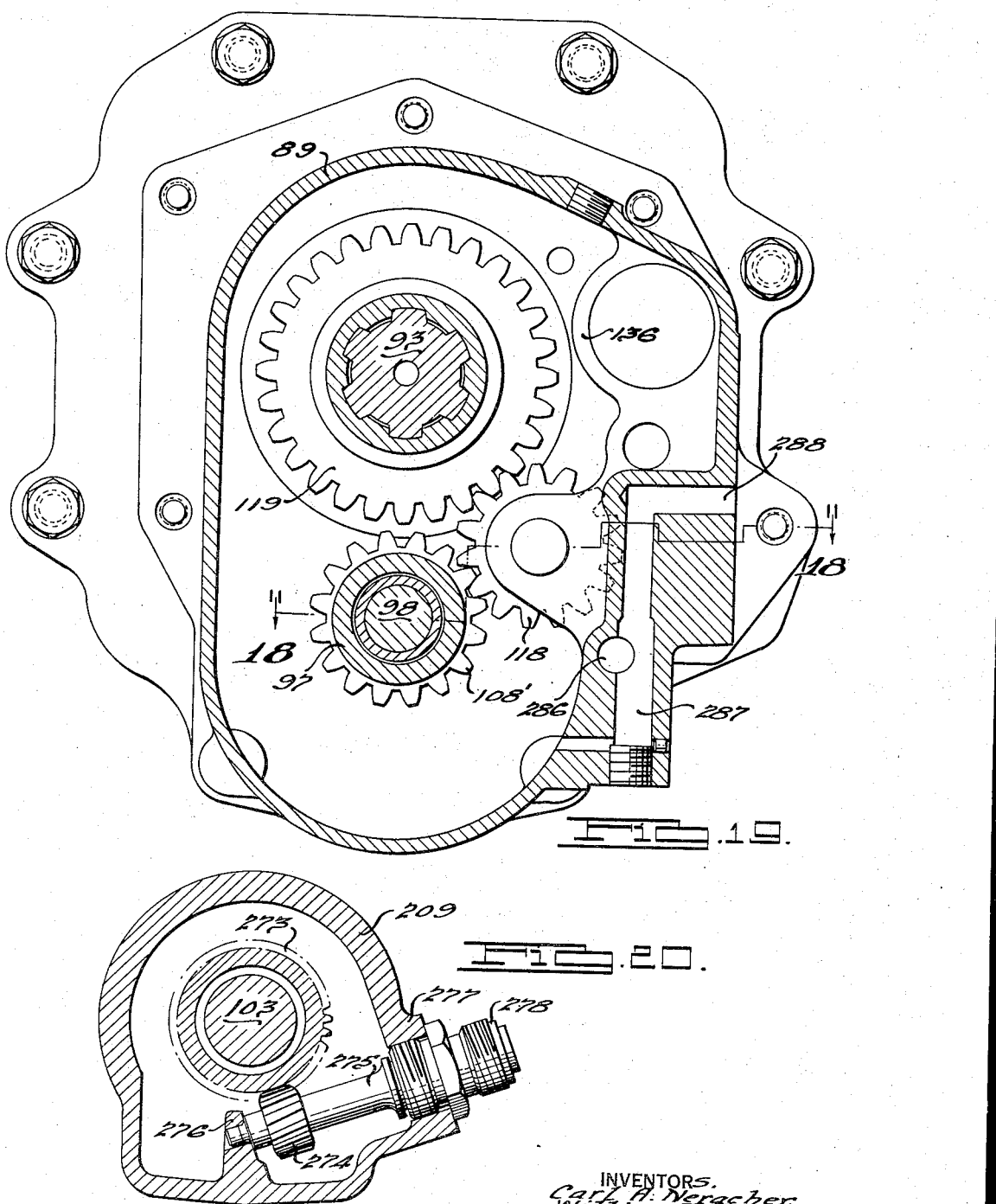

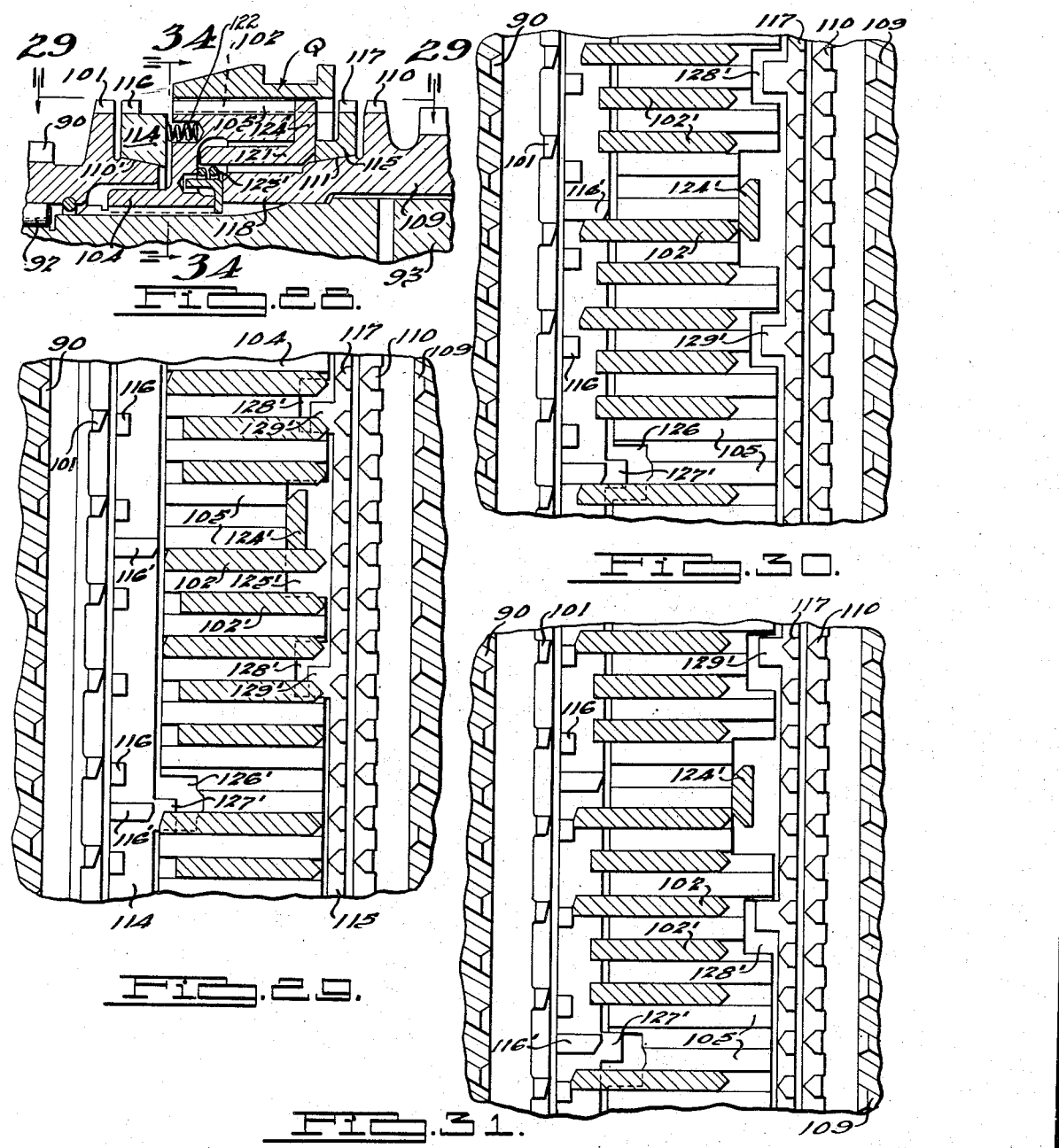

Feb. 29, 1944. C. A. NERACHER ET AL 2,342,960
POWER TRANSMISSION
Original Filed Jan. 16, 1941 13 Sheets-Sheet 13
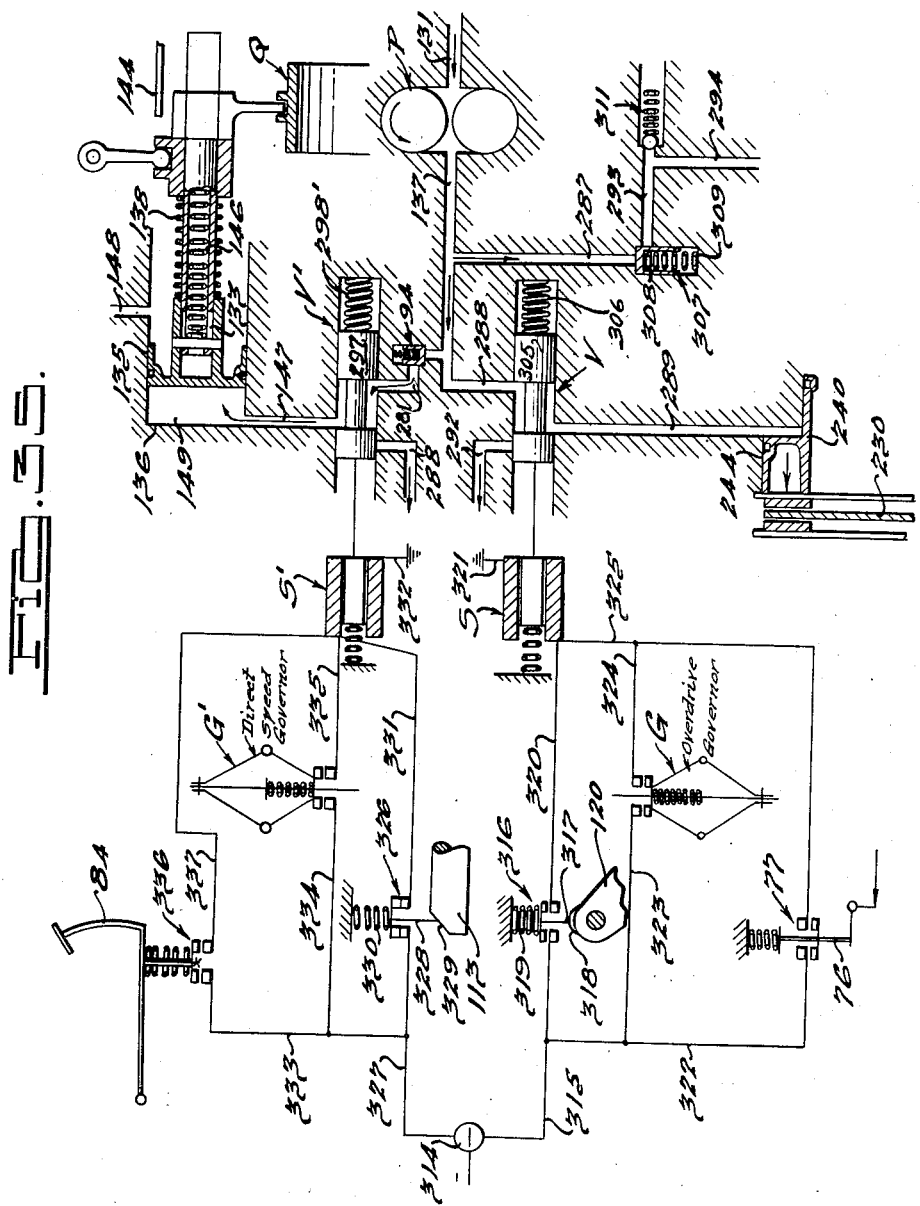
INVENTORS.
Carl A. Neracher,
William T. Dunn,
BY Augustin J. Syrovy,
Otto W. Schotz.
ATTORNEYS.

Patented Feb. 29, 1944

2,342,960

UNITED STATES PATENT OFFICE 2,342,960

POWER TRANSMISSION

Carl A. Neracher, William T. Dunn, Augustin J. Syrovy, and Otto W. Schotz, Detroit, Mich., assignors to Chrysler Corporation, Highland Park, Mich., a corporation of Delaware Original application January 16, 1941, Serial No. 374,674. Divided and this application April 4, 1942, Serial No. 437,630

8 Claims. (Cl. 74—336.5)

This application is a division of our co-pending application filed January 16, 1941, Serial No. 374,674.

The invention claimed herein is directed to an improved fluid control means for an automatic or semi-automatic power transmission wherein a plurality of speed ratio changes are made in sequence under fluid pressure control.

It frequently occurs in these types of transmissions that the sequential operation of valves for establishing the different changes in speed ratio is accompanied by violent fluctuations in the line pressure such that, in some instances, the pressure falls to a low value and unintended changes in speed ratio occur.

It is, therefore, the principal object of this invention to provide an improved fluid pressure supply system for these types of transmissions.

A further object is to provide a fluid pressure supply system which includes a plurality of check valves arranged in a novel manner such that once one of the fluid motors has been operated, sufficient pressure will be maintained in that motor to prevent unintentional reverse operation thereof during the operation of other motors connected to the same line.

Other objects and advantages will be apparent from the following description which discloses one embodiment of the invention.

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is an enlarged view of a portion of the Fig. 1 shift apparatus.

Fig. 6 is a detail sectional view taken as indicated by line 6—6 of Fig. 5.

Fig. 7 is a detail sectional view taken as indicated by line 7—7 of Fig. 6.

Fig. 7A is a detail sectional elevational view of a portion of the engine throttle operating mechanism shown in Fig. 1.

Fig. 8 is an enlarged side view partly in section and partly in elevation showing the Fig. 1 power transmission.

Fig. 9 is a sectional elevational view through the speed ratio changing transmission which is illustrated in elevation in Fig. 8.

Fig. 9A is an enlarged sectional detail of the sun gear clutch of Fig. 9.

Fig. 9B is an enlarged detail of the sun gear brake anchorage structure of Fig. 9.

Fig. 10 is a transverse sectional view looking forwardly as indicated by line 10—10 of Fig. 9, showing the transmission portion of the remote shift mechanism.

Fig. 11 is a detail elevational view taken as indicated by line 11—11 of Fig. 10, certain of the oil pressure lines being shown in dotted lines.

Fig. 12 is a plan view taken as indicated by line 12—12 of Fig. 10, certain parts being broken away to show sectional details thereof.

Fig. 13 is a detail sectional view taken as indicated by line 13—13 of Fig. 10.

Fig. 14 is a detail elevational view taken as indicated by line 14—14 of Fig. 10, certain parts being broken away to show sectional details thereof.

Fig. 15 is a detail sectional view taken as indicated by line 15—15 of Fig. 14.

Fig. 16 is a detail sectional view taken as indicated by the line 16—16 of Fig. 9.

Fig. 17 is a detail sectional view taken as indicated by the line 17—17 of Fig. 9.

Fig. 18 is a detail sectional view taken as indicated by the line 18—18 of Fig. 19.

Fig. 19 is a detail sectional view taken as indicated by the line 19—19 of Fig. 9, looking rearwardly of the transmission.

Fig. 20 is a detailed sectional view taken as indicated by the line 20—20 of Fig. 9.

Fig. 21 is an enlarged sectional view taken as indicated by the line 21—21 of Fig. 9.

Fig. 22 is an enlarged sectional view taken as indicated by the line 22—22 of Fig. 9.

Fig. 26 is an end view of one of the governors shown in Fig. 11 with the cover removed.

Fig. 27 is an enlarged sectional detail view taken as indicated by the line 27—27 of Fig. 26.

Fig. 28 is an enlarged detail sectional view of the synchronous blocker clutch and free wheeling control mechanism.

Fig. 29 is a sectional plan view of the clutch teeth taken as indicated by the line 29—29 of Fig. 28 showing the clutch sleeve in neutral position.

Fig. 30 is a view similar to Fig. 29 showing the clutch sleeve in free wheeling second speed ratio position.

Fig. 31 is a similar view showing the clutch sleeve in coast block position.

Fig. 32 is a similar view showing the clutch sleeve in drive block position.

Fig. 33 is a similar view showing the clutch sleeve in one of its engaged positions.

Fig. 34 is a sectional view taken as indicated by the line 34—34 of Fig. 28.

Fig. 35 is a diagrammatic view of the transmission control system.

Figure 23:
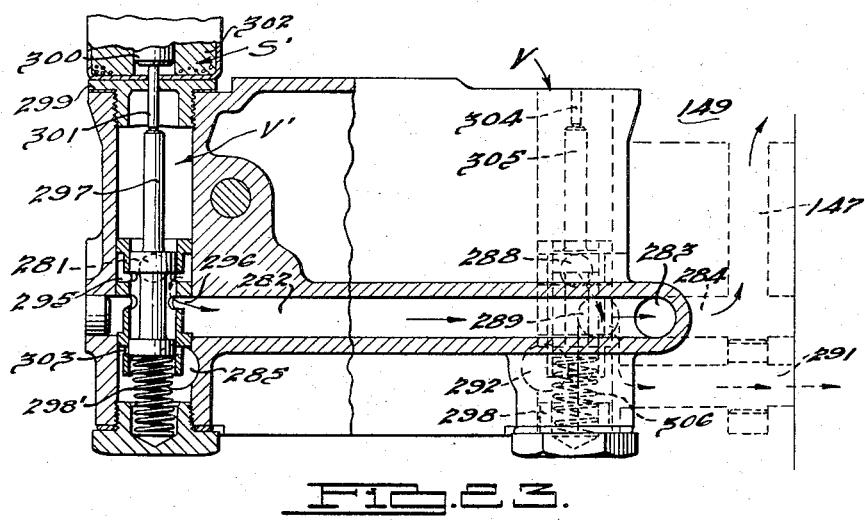
Fig. 23 is an enlarged sectional view of a portion of the transmission case cover with parts broken away to show details of the hydraulic system.

We have illustrated the principles of our invention in connection with a motor vehicle drive wherein the usual engine A transmits its drive through clutching means B, C, within casing 50, the drive then passing through the underdrive transmission D, overdrive transmission E and propeller shaft 51 (Fig. 2) to the differential 52 and thence to the vehicle ground wheels 53 where it is desired to drive the rear wheels according to present day practice.

By preference, the arrangement is such that the drive from the engine passes through an underdrive unit, then through an overdrive unit so that when both units are operating in highest ratio the car is driven in an overdrive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation which is especially objectionable in city driving.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toeboard 61 to swing downwardly against restoring spring 62 to thrust through the system of pivotally jointed links 63, 64 and connecting lever 65, the latter being pivotally supported at 66.

The link 64 operates lever 57 through a lost motion device T (Fig. 7A) serving to normally connect these parts as a solid member but affording thrust of link 64 forwardly after lever 57 has engaged its limiting stop 58 to effect the kickdown control on the transmission. Thus, link 64 has its forward end slidable in bore 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yielding of spring 69 while the throttle valve remains fully open. On release of the accelerator pedal, springs 69 and 62 both act until collar 70 engages the rear flange 72 of bracket 71 and thereafter, throughout the normal range of throttle adjustment, spring 62 alone serves to restore pedal 59 and close the throttle valve.

The kickdown range of accelerator pedal movement is utilized to effect release of the reaction gear of the overdrive unit for a quick change from overdrive to direct drive without necessity of engine ignition interruption. The throttle being open will cause the engine to rapidly speed up as soon as the lower driving ratio becomes effective.

While in the present embodiment of the invention, overtravel of the throttle adjusting mechanism for obtaining kickdown is used, it is obvious that such overtravel is not absolutely necessary, and lost motion mechanism F could be omitted without materially affecting the operation of the device. If mechanism T is omitted, the kickdown control switch is arranged to be closed at wide open throttle position of the lever 57 or just prior to the time said lever reaches that position. Inasmuch as the last increment of movement of the throttle valve has very little effect upon engine performance, practically identical operating characteristics will be obtained without the lost motion mechanism T as with it.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77.

We preferably transmit the drive from the engine A to underdrive transmission D through clutch means comprising a fluid coupling B of the kinetic type preferably in conjunction with a releasable clutch C of a conventional design employed to facilitate manual shifts in transmission D, and to accommodate stopping the car in gear without tendency of the coupling B to cause the car to creep especially where the idle is set "fast" (as during winter starting), or where the throttle is accidentally opened.

The engine crankshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 83 and is drivingly disengaged by depressing a clutch pedal 84 (Fig. 1) which slides the throwout member 85 forwardly to operate levers 86 to unload driving pressure plate 87, springs 88 loading this plate and engaging the clutch when pedal 84 is released.

Shaft 83 extends rearwardly into the housing 89 of underdrive unit D (Fig. 9) where it is formed with a main drive pinion 90 and a set of external driving teeth 101 which are adapted to slidably engage internal clutch teeth 102 of the synchronous coupling clutch sleeve Q (Fig. 29). Fixed to the shaft 83 is a hub 104 formed with external teeth 105 slidably engaged with the internal teeth 102 and 102' of a shiftable clutch sleeve Q which is adapted to be shifted forwardly or rearwardly by a fork 112 fixed to a longitudinally extending shift rail 113 (Fig. 14) disposed on the left side of shaft 93 (looking forwardly of the vehicle).

The drive pinion 90 is hollow and journals, by a bearing 92, the forward end of the intermediate transmission driven shaft 93 which is adapted to drive the tailshaft 103. The latter may carry the usual propeller shaft brake drum having braking mechanism operably associated therewith (not shown). The drive pinion 90 is continuously meshed with a gear 96 for driving the countershaft cluster 97 rotatable on a countershaft support 98.

The cluster 97 also includes a gear 107 which drives a pump P (Figs. 9 and 16). The pump P develops the fluid pressure necessary to the operation of the automatic phase of the transmission and for lubrication thereof and is of the well known Gerotor type having an inner driving member 123 and an outer driven member 124 defining intake and delivery chambers 125 and 126, respectively. The driving member 123 is secured to a shaft 127 rotatable in a stationary pump housing 128 closed by a cover 129 at its outer end. The upper end of shaft 127 carries a gear 130 which meshes with the pump drive gear 107 of the countershaft cluster 97.

Figure 25:
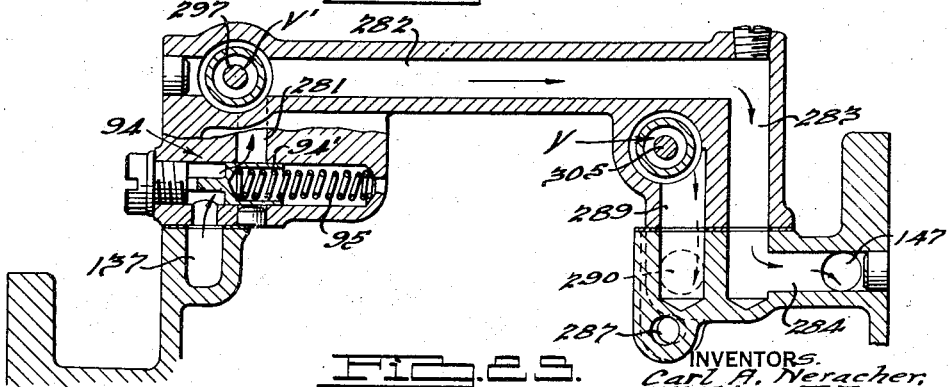
Fig. 25 is a sectional view taken as indicated by the line 25—25 of Fig. 11.

The intake or suction chamber 125 receives a constant supply of oil through an inlet passage 131 which opens into the oil reservoir or sump 132 along the bottom of the underdrive transmission casing 89. The oil under pressure is delivered from the pump pressure chamber 126 upwardly through the delivery passage 137 (Figs. 10 and 14) which is in communication with a restriction valve 94 (Fig. 25). The valve 94 has a plunger 94' which is adapted to be moved against the pressure of a regulating spring 95 for controlling the flow of fluid to the direct speed fluid pressure motor.

The cluster 97 is further formed with gears 106, 108 and 108'. Gear 106 is in constant mesh with a gear 109 which is freely journalled on driven shaft 93. The reverse gear 108' is permanently meshed with an idler gear 118 (Figs. 18 and 19).

A gear 119 slidably splined on the shaft 93 is adapted to be shifted by a shift fork 120 into mesh with the gear 108 to establish emergency low speed ratio drive, or into mesh with the gear 108' to establish reverse drive.

A pair of synchronizing blocker rings 114, 115 are, respectively disposed between the hub 104 and gears 90 and 109 and are driven with hub 104 with slight rotational clearance (Fig. 28). These blockers have cammed teeth 116, 116', 117, the pitch circle thereof being the same as that of sleeve teeth 102 and 102', and teeth 101 and 110, and they are adapted to frictionally engage the coneshaped clutching surfaces 110' and 111 respectively. If desired, energizing springs 122 may be provided between the blockers to lightly urge them into engagement with cones 110' and 111 respectively so that the blocker teeth 116, 117 are misaligned with the sleeve teeth 102 thereby preventing shift of sleeve Q as long as the parts to be clutched are rotating at different speeds. The synchronizing blocker rings are more fully described and claimed in the copending application of O. E. Fishburn, Serial No. 180,840, filed December 20, 1937.

As illustrated in Figs. 9 and 28, the second or intermediate speed driven gear 109 has clutch teeth 110 formed thereon and is provided with a reduced sleeve portion 118 which extends forwardly in telescoping relation with the hub 104. A roller clutch, designated generally by the letter F, is disposed between the hub 104 and the extension 118 as more clearly shown in Fig. 22. The hub 104 has cam surfaces 119 formed therein which are adapted to cooperate with rollers 120 to provide a one-way driving connection between the hub and sleeve portion 118 when the rollers are wedged between the said cam surfaces and the outer cylindrical surface of the sleeve. A cage 121 retains the rollers in properly spaced relation. A coil spring 123' is operatively connected between the cage 121 and the hub 104 and urges the cage and rollers in a counterclockwise direction of rotation as indicated by the arrow in Fig. 22.

The cage 121 is provided with a pair of diametrically oppositely directed fingers 124' which extend radially outwardly through slots 125' provided in hub 104. The fingers 124' are shaped as shown in Fig. 29 and are of such length that they engage between the teeth 102 and 102' of sleeve Q, a pair of diametrically oppositely disposed teeth having been omitted to provide space for the relatively wide finger as illustrated in Fig. 29.

Figure 24:
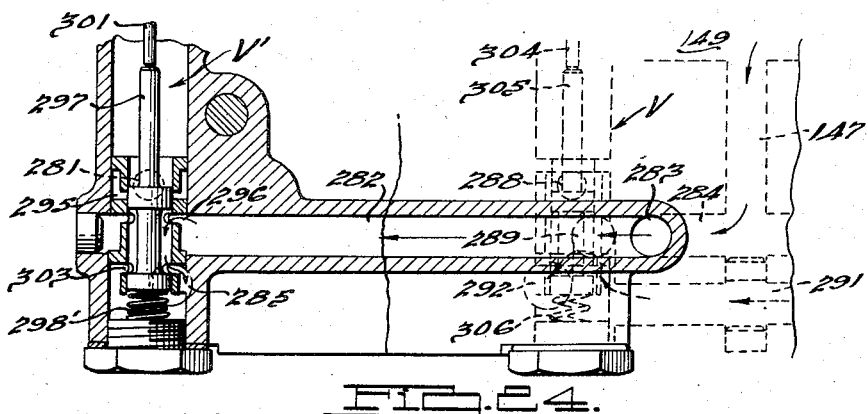
Fig. 24 is a view similar to Fig. 23, but with the valve member thereof in a different operative position.

The hub 104 is provided in its front face with a pair of diametrically oppositely disposed slots 126' which are adapted to receive a pair of lugs 127' carried by the blocker member 114 (Figs. 9, 29 and 24). The slots 126' are larger than the lugs and serve to provide a driving connection between the hub and blocker member which permit relative movement therebetween as will be more fully explained hereinafter.

Similarly, the rear face of hub 104 is provided with a series of slots 128', of which there are four, for receiving the driving lugs 129' of the blocker member 115.

Fig. 29 illustrates the positions of the various parts when the sleeve Q is in neutral position with the tail-shaft 103 stationary and the engine running with the clutch C engaged. Under these conditions and looking from the forward end of the vehicle the gear 90 is rotating clockwise and the blocker 114 is rotated by friction to the position shown, the lugs 127' thereof engaging the leading sides of the slots 126'. Similarly, the gear 109 is rotating clockwise thereby causing the lugs 129' of blocker 115 to engage the leading sides of the slots 128'.

The finger 124', which is biased to clockwise rotation, is held in the neutral zone by one of the long sleeve teeth 102, the rollers 120A of clutch F being likewise in neutral as illustrated in Fig. 22.

When sleeve Q is shifted rearwardly (by means which will be described later on herein) the sleeve teeth 102 and 102' will be blocked by engagement of the chamfered ends thereof with the chamfered ends of the blocker teeth 117 until the gear 109 and the sleeve become synchronized through the action of the clutching engagement of the blocker at surface 111. Upon synchronization of the teeth 102 and 110, the blocker will be rotated to non-blocking position assisted by the pressure of the teeth 102 and 102' and the teeth 102 and 102' will slide through the teeth 117 and into engagement with the teeth 110. This position of the sleeve Q is known as the non-freewheeling-second-speed-ratio position and the drive from the shaft 83 is transmitted through gears 90, 96, 106 and 109, sleeve Q and hub 104 to shaft 93.

Forward shift of the sleeve Q from its Fig. 29 position to its Fig. 30 position will permit the finger 124' to rotate forwardly (clockwise) sufficiently under the action of the spring 123' to lock rollers 120A between the cam surfaces 119 and the outer cylindrical surface of the sleeve portion 118 of gear 109 thereby forming a one-way overrunning drive connection between gear 109 and hub 104. This position is known as the free-wheeling-second-speed-ratio position and the drive from shaft 83 is transmitted to shaft 93 through gears 90, 96, 106, 109, rollers 120 and hub 104. Shift of the sleeve to this position will be blocked by engagement of the long teeth 102 with the long blocker teeth 116' until the sleeve Q becomes synchronized with the gear 90 through the action of the clutching surface 110'. It will be noted that the long teeth 102 are chamfered at their forward ends and the teeth 116' are correspondingly chamfered to assist the unblocking movement of the blocker at the instant of synchronization. Fig. 30 illustrates the relative positions of the lugs 127' and the teeth in free-wheeling-second-speed ratio position.

Further movement of the sleeve Q forwardly during rotation of pinion 90 will be prevented by engagement of the short teeth 102' with the short blocker teeth 116 as illustrated in Fig. 32. This position is known as the drive-block position and occurs during normal operation of the transmission under conditions when the sleeve Q is urged forwardly either by manual or power actuated means (as will be hereinafter explained) during the time that pinion 90 is rotating faster than the shaft 93.

Release of the vehicle accelerator pedal during driving in drive block position will cause the pinion 90 to drop off in speed and when it drops to a speed slightly below the speed of the shaft 93 (which action is assisted by the clutching action of the blocker 114 at the surface 110') the blocker 114 will relatively speaking be rotated backwardly (counterclockwise) to unblock the teeth 102—102' and permit these teeth to pass through into engagement with the clutch teeth 101. This position is illustrated in Fig. 33 and is the direct drive position of the sleeve Q, the shafts 83 and 93 being locked to one another.

During operation of the transmission it sometimes occurs that an attempt will be made to shift the sleeve Q into direct drive position during the time that the shaft 93 and hub 104 are rotating faster than pinion 90. Under such conditions the shift will be prevented by the short blocker teeth 116 which will be engaged by the long teeth 102 of the sleeve. This is the coast-block position illustrated in Fig. 31. If the pinion 90 is accelerated in speed while the parts are in the Fig. 31 position the blocker 114 will rotate forwardly relative to the sleeve under the clutching action at the surface 110', and unblock the teeth 102 but the sleeve will not be completely unblocked because the short blocker teeth 116 will then be engaged by the short sleeve teeth 102' in the drive-block position of the sleeve.

It is therefore apparent that the sleeve Q is blocked against shift under all conditions except when the teeth to be engaged thereby are rotating at substantially synchronous speed relatively thereto. In addition, shift of sleeve Q to drivingly engage the rollers of overrunning clutch F is prevented unless parts 104 and 118 of the clutch are synchronized. These shifting functions will be hereinafter further explained in connection with the operation of the entire transmission.

The mechanism for shifting sleeve Q will now be described. Referring to Figs. 10 to 14, inclusive, it will be seen that the shift yokes or forks 112 and 120 are slidably mounted on a rod 131 carried by the casing 89. Slidable with the yoke 112 is a rail 113, one end of which is carried by a boss 132. The other end portion of the rail is provided with a slot 133 which slidably receives a pin 134. The latter is fixed at each end in a piston 135 slidably disposed in a cylinder 136 formed in the casing. A spring 138 surrounds the rail 113 and abuts the inner surface of the piston and the adjacent surface 139 of a shift element 140. The latter is slidable on the rail 113 and is adapted to abut the portion 141 of the yoke 112 to shift the latter into free-wheeling-second-speed ratio position under manual control of a shift finger 142 which is adapted to engage a slot 143 (Fig. 14) provided in the element 140. Forward shifting movement of the element 140 is limited by a pair of abutment rods 144 which engage the element and prevent shift thereof beyond the free-wheeling-second-speed ratio position.

The rail 113 is further provided with a bore 145 in which is disposed a second coil spring 146. The latter abuts the pin 134 and the closed end of the bore. Fluid under pressure is adapted to enter cylinder 136 through passage 147, suitable control mechanism, hereinafter to be described, being provided. When the rail 113, yoke 112, sleeve Q and element 140 are in free-wheeling-second-speed ratio position, admission of fluid into cylinder 136 will cause forward movement of piston 135 thereby compressing springs 138 and 145, the pin 134 sliding forwardly in the slot 133. If the sleeve Q is at this instant blocked against shift to direct drive position the yoke 112 cannot, of course, shift. When the sleeve is unblocked it will be shifted to direct drive position by the spring 145 and retained in this position as long as pressure is on in cylinder 136. An outlet port 148 is provided in the cylinder to prevent building up of excess pressure during the time the parts are in direct position. If the pressure in cylinder 136 is cut off, the spring 138 will shift the piston 135 together with the rail 113, yoke 112 and sleeve Q back to free-wheeling-second-speed position, the element 140 remaining all the while in its free-wheeling-second-speed position.

Shift of the sleeve Q to non-free-wheeling-second-speed position is accomplished manually by swinging finger 142 clockwise of Fig. 12 thereby shifting the sleeve into engagement with the clutch teeth 110, and moving the rail 113 and its associated mechanism bodily toward the right, the movement of piston 135 being accommodated by the space 149 in the cylinder head 150.

The low-reverse ratio shift yoke 120 has a portion 151 fixed to a rail 130 which is disposed parallel to and below the rail 113 for sliding movement in bosses 152—153. Shift of the rail 130 to the right of Figs. 13 and 14 will engage gear 119 with reverse idler 118 (Fig. 19) and shift thereof to the left will engage gear 119 with the low speed countershaft gear 108.

Suitable detent mechanism is provided for releasably holding the rails in their various positions. A detent ball 154 is adapted to engage the central of three recesses 155 for holding the rail 113 in neutral position. When the rail is shifted to non-free-wheeling-second-speed position the ball 154 engages the left hand recess, and when the rail is shifted to free-wheeling-second-speed position the ball engages the right hand recess. The rail is retained in direct drive position by the fluid pressure in the cylinder 136 so no detent is necessary.

The rail 130 is provided with recesses 156 which are engaged by a detent ball 157 to releasably hold the rail in neutral, low and reverse positions. An interlock pin 158 (Fig. 14) is adapted to engage one or the other of recesses 159 and 160 provided in rails 113 and 130 respectively to prevent shifting of one rail when the other is in driving position.

The shift finger 142 is carried by a collar 159 which is slidably carried on a rockshaft 160. The latter is carried by a pair of aligned bosses 161—162 formed in the cover plate 163 which is adapted to be secured to the left hand side of the casing 89 over the opening provided therein and shown in Fig. 14. The collar 159 is non-rotatably carried on the rockshaft 160 and is provided with a washer 164 against which a coil spring 165 abuts, the other end of the spring abutting a retainer 166 carried by the rockshaft. The spring 165 continuously urges the collar upwardly and yieldably retains the finger 142 in engagement with the slot 143 of element 140 (Fig. 14). A U-shaped lever 167 pivoted to the cover 163 by shaft 168 (Figs. 11 and 13) has rounded end portions which bear on the top surface of the washer 164. A lever 169 (Figs. 1 and 13) is fixed to the shaft 168 at the outside of the cover by a nut 170. Swinging of the lever 169 will move the collar 159 downwardly of the rockshaft 160 against the force of spring 165 to disengage the finger 142 from slot 143 of element 140 and engage it in slot 170 of the portion 151 of yoke 120.

The rockshaft 160 has a shift lever 171 (Figs. 1 and 10) fixed thereto by a nut 172 for rocking the same to effect shift of rail 113 or 130 depending upon which of the particular slots is engaged by finger 142.

The shift lever 171 and selector lever 169 are controlled by suitable mechanism illustrated in Figs. 1 and 3 to 7, inclusive.

A shift lever 173 is carried by the vehicle steering column, indicated generally by numeral 174.

The lever 173 is carried directly by a casing 175 having separable sections mounted on the steering column 174. The said lever has a knob 176 on its outer end and a forked inner extremity 177 disposed within the casing 175. Provided on the lever 173 adjacent its forked end is a ball-shaped enlargement 178 which is disposed between wear plates 179 and 179A mounted on the opposite side walls of an arcuate slot 180 formed in the casing 175 through which the lever 173 extends. The enlarged portion 178 of the control lever has a bore in which a spring pressed detent ball 181 is disposed. Detent ball 181 is adapted to engage in an aperture formed in the lower wear plate 179 when the lever 173 is centrally located with respect to the opposite ends of the slot. The steering column generally indicated at 174 includes an outer tube on which the casing 175 is mounted and an inner tubular steering shaft 182 which is provided with a steering wheel 183 at the top end thereof as is conventional in the art. The steering shaft 182 extends longitudinally of the steering column and is centrally located with respect to the longitudinal axis thereof.

A tubular shaft 184 extends longitudinally of the steering column and is axially slidably and rotatably supported by the column structure. Mounted in the upper open end of the tubular shaft 184 is a sleeve 185 which is welded or otherwise suitably secured thereto and which extends beyond the upper extremity of this shaft. A collar 186 is concentrically mounted on the portion of the sleeve 185 which extends beyond the shaft 184 and is detachably and non-rotatably held thereon by a nut 187 threaded on the upper end portion of the sleeve as shown in Fig. 3. The collar 186 is provided with diametrically opposed bosses in which are formed holes for receiving bolts 188 which fasten the apertured end portions of the fork 177 to the collar. The bolts or pins 188 pivotally attach the lever to the bosses and the enlarged portion 178 of the lever serves as a fulcrum about which the lever may be oscillated in a vertical plane to shift the shaft 184 axially of the steering column. The shaft 184 may be rotated about its axis which is coincident to the longitudinal axis of the steering column by swinging the lever 173 about the axis of the steering column and during this movement of the lever the enlarged portion 178 thereof slides freely on the bearing surfaces provided by the wear plates 179 and 179A with which the walls of the slot 180 are lined.

At the bottom of the steering column the tube 174 thereof is provided with a slot 189 through which a lever 190 extends. This lever is welded to the lower end of the tubular shaft 184 as illustrated in Fig. 6 and is connected by means of a pin 191 with an operating rod 192.

Partly surrounding the slot 189 is a housing structure 193 which has a tab 194 on which is pivoted a bellcrank lever 195, the latter having a rounded end portion 196 which bears against the enlarged portion 197 of the lever 190. On the opposite side of the steering column the housing structure 193 has a depending bracket 198 which supports the upper end of a Bowden cable structure 199. The flexible, motion transmitting cable 200 of the Bowden cable structure is connected with the lower leg 201 of the bellcrank 195 and a spring 202 is connected between the bellcrank lever and the bracket 198 in such manner that the bellcrank lever continuously urges the shaft 184 upwardly of the column 174.

The rod 192 is connected with one leg of a second bellcrank lever 203 pivoted at 204 on the block of the engine A, the other leg of said bellcrank lever being pivotally connected at 205 with an operating rod 206 which is pivotally connected at its rearward end with the shift lever 171. The opposite end of the motion transmitting cable 200 of the Bowden cable structure 199 is connected with the selector lever 169 as shown in Fig. 1.

It will therefore be understood that the manually operable shift lever 173 is capable of swinging movement about the axis of the steering column in two paths, the said paths being disposed in parallelism one below the other. In shifting the ratio establishing mechanism in casing 89 the lever 173 may be rocked upwardly of the steering column which shifts the shaft 182 axially downwardly of the steering column thereby rocking the bellcrank 195 about its pivot which in turn, through the medium of the Bowden cable structure, swings the selector lever 169 clockwise of Fig. 1 thereupon effecting downward movement of the collar 159 against the force of the spring 165 to disengage the shift finger 142 from the slot 143 and engage it in the slot 170.

The lever 173 is then adapted to be swung in its upper path of movement. Swinging of the lever in a counterclockwise direction as viewed in Fig. 4 will cause the bellcrank lever 203 to be swung in a clockwise direction, this in turn, through the medium of the operating rod 206, causing the shift lever 171 to be swung clockwise of Fig. 12 whereupon gear 119 is shifted into engagement with reverse idler 118. Swinging of the lever 173 clockwise of Fig. 4 shifts the gear 119 into engagement with low speed drive gear 108.

Counterclockwise swinging of lever 173 in its lower path of movement will effect shift of the coupling sleeve Q into engagement with clutch teeth 110 thereby establishing non-free-wheeling-second-speed-ratio setting of the transmission, the finger 142, of course, being engaged with the slot 143. Clockwise swinging of the lever 173 will effect shift of sleeve Q into free-wheeling-second-speed-ratio-setting, the shifting movement of the sleeve Q being limited by engagement of the member 140 with the rod 144.

Referring now to Figs. 9, 9A and 21, it may be seen that the intermediate drive shaft 93 is supported by an anti-friction bearing 207 carried by an adaptor plate 208 which is disposed between the housing 89 and a housing 209 which encloses the overdrive unit E. The housing 89, plate 208 and housing 209 are all secured together by suitable securing means, one of the cap screws forming a part thereof being shown at 210.

The rear end portion of the shaft 93 is splined at 211 for connection with the planet carrier 212 of the planetary overdrive unit E. The carrier 212 is provided with mating splines 213 and carries a plurality of axles 214 on which are rotatably mounted a plurality of planet pinions 215. The latter mesh respectively with a sun gear 216 rotatably carried on the shaft 93 and an annulus gear 217 which has a hollow portion 218 extending rearwardly to a splined connection at 219 with the tailshaft 103.

The carrier 212 has a rearwardly extending sleeve portion formed in its outer surface with a plurality of cams 220 which are adapted to cooperate with the rollers 221 of an overrunning one-way clutch H to lock the carrier to the inner cylindrical surface 222 of the annulus gear portion 218 thereby to transmit drive in the forward direction when the shaft 93 tends to overrun the shaft 103. The rollers 221 are spaced by a cage 223 which is urged by a spring 224 toward engaged position. The rollers 221 permit the shaft 103 and annulus 217 to overrun the shaft 93 and carrier 212, but prevent the shaft 93 from overrunning the shaft 103.

Slidably splined on the sun gear 216 at 225 is a sleeve 226 provided with outer splines 227. At the rear end of the sleeve 226, the splines are enlarged to form clutch teeth 228 which are adapted to mesh with clutch teeth 229 integrally formed on the carrier 212. A pair of annular brake elements 230 are carried on the splines 227, the rearwardly disposed element being prevented from sliding relative to the sleeve 226 by a snap ring 231.

The brake elements 230 are adapted for friction engagement by a plurality of brake shoes 232 which are formed of friction material. The shoes or bands 232 are anchored to the casing 209 at four places, Fig. 9B showing one of the anchoring devices in detail.

The brake shoes 232 are carried by annular metal plates 233 which are provided with integral ears 234. The ears 234 extend into slots 235 formed in the housing 209 and shaped to receive the ears. A coil spring 236 acts to urge the outer plates 233 apart, the spring surrounding a bolt 238 which passes through all three ears as illustrated. The inside plate 233 is urged to spaced relation by a spring 237 which is carried by a cup-like sleeve 239 disposed between the forward and middle ears as shown.

The brake shoes 232 are urged into frictional engagement with the elements 230 by a hydraulic piston 240. This piston is of annular shape and surrounds the planetary gearset as illustrated in Fig. 9. The piston has an annular rearwardly extending portion 241 which snugly engages the inner surface of a cylinder 244 formed interiorly of the casing 209 as shown. The casing has a shoulder 243 which extends around the upper half thereof to form a cylinder head, the lower portion of the head being formed inside the casing. Suitable piston rings 242 are provided to insure a good seal.

The lower portion of the cylinder 244 is provided with an opening 245 which communicates with a chamber 246, the latter in turn, being open to a supply pipe or conduit 247.

Admission of pressure fluid into chamber 246 causes forward movement of the piston 240 thereby compressing the brake elements 230 and the brake shoes 232 to hold the sun gear 216 against rotation. It will be seen from Figs. 9, 9A and 9B that, as the rear brake element 230 moves forwardly, it also shifts the sleeve 226 forwardly so that the clutch teeth 228 are disengaged from the clutch teeth 229. The carrier 212 is therefore disengaged from driving relationship with the sun gear 216 when the brake is set to render the sun gear non-rotatable.

Forward movement of the brake elements and shoes compresses the springs 236, 237 and also the springs 248 and 249. The spring 248 acts between the rear brake element 230 and a ring 250 which bears against the adapter plate 208, a sleeve 251 partially enclosing the spring and having a lip engaging the forward brake element in a manner similar to the arrangement of the springs 236. There are a plurality of springs 248 corresponding in number to the springs 236 so that the brake elements and shoes will be maintained in positive non-dragging relationship at all times when pressure is off in chamber 246.

The spring 249 is of greater force than the springs 236, 237 and 248 and bears on the ring 250 and the forward brake element 230 and assists the action of these springs.

The teeth 228—229 are of the well known Maybach type and are adapted to engage under the action of the springs 236, 237, 248 and 249 when pressure is off in chamber 246.

The rearwardly extending portion 218 of the annulus gear 217 is provided with a cylindrical portion on which is non-rotatably carried a helical gear 252 which meshes with a second helical gear 253 carried on the central portion of a shaft 254 which is rotatable in bosses 255. On each end of shaft 254 is secured a plate 256. Each of these plates has a casing 257 secured thereto by screws 258. The casings 257 each contain governor actuated switch mechanisms referred to generally by the letters G and G'.

The governor mechanisms G and G' (Figs. 17, 26 and 27) are each rotatable in the round recesses 259 provided in the casing 209. Each governor comprises a shaft 260 which is rotatable with the shaft 254. The shaft 260 has a head 261 which carries a pair of weights 262 carried by pivot pins 263. The weights are constrained to swing in unison by reason of an equalizer connection 264 and each weight has a stop pin 265 operable in a slot 266 in head 261. The weights are yieldably urged inwardly by a flat leaf spring 267 which is bowed between stops 268 carried by the weights and after the shaft 260, during car acceleration, is rotating at a predetermined desired speed, the weights swing out thereby further bowing and tensioning the spring 267 and opening the switch which is operably associated with the weights. These switches may be of any suitable construction and the operation thereof will be described later on in connection with the description of operation of the transmission.

The governors G and G' are adapted to operate their respective switches at different speeds, it being necessary to the operation of the transmission to have the governor G, which controls operation of the overdrive piston 240, open its switch at a low speed, and to have the governor G', which controls operation of the direct drive piston 135, open its switch at a relatively higher speed. The governors may be given any desired operating characteristics by substituting various springs 267 of different strengths.

Both governors are constructed so that there is a differential in the operation of the respectively associated switches, the mechanism being arranged so that the switches close at a much lower speed than that required to open them although such relationship may be varied as desired.

Accordingly, the governor weights 262 of governor G' may each carry a ball detent 269 loaded adjustably by a spring 270 such that as the weights spring out, the balls 269 will enter notches 272 in the plate 256 and serve to prevent return of the weights and closing of the associated switch until the desired speed of the car has been reached on retarding the same for example to bring the car to rest. The provision of the ball detents 269 provide a convenient means of adjusting or changing the speed responsive operation of the governor by varying the position of the spring tentioning screws 271.

The governor G is constructed in a similar manner and operates to hold the overdrive gear train in overdriving position until the car speed is reduced to a lower value than that at which the shift to overdrive is made on car acceleration.

The tailshaft 103 has a helical gear 273 (Figs. 9 and 20) splined thereon which meshes with a mating gear 274 carried by a shaft 275 which is mounted in bosses 276—277 in casing 209. The outer end of the shaft 275 carries a connection member 278 adapted to be connected to the flexible cable (not shown) of a regular speedometer drive mechanism. A ball or other suitable type of bearing 279 supports the tail shaft 103 at the rear end of the casing 209, a suitable seal 280 being interposed between the shaft and casing at the extreme rear end thereof to prevent escape of lubricant. The shaft 103 is adapted to mount a parking brake mechanism (not shown) at 281'.

Referring now to Figs. 9–19, 23–25 and 35, it may be seen that the oil discharged from the pressure chamber 126 of pump P through passage 137 (Figs. 10, 11, 14, 15 and 25) of the casing 89 may flow upwardly into the chamber of valve 94 (Fig. 25) or rearwardly through passage 286 (Figs. 14, 15).

The valve 94 is connected to a valve V' carried by the cover 163 and which controls the action of the direct speed piston 135, by a passage 281. The valve 94 is a restriction valve and functions to prevent drop in pressure in passages 286, 287 and 288 (which connect with the overdrive brake operating motor) when valve V' is opened. This action will be hereinafter more fully expl'ined.

The passage 281 leads into the chamber of valve V' as shown in Figs. 23 and 25, and when the valve is in its open (Fig. 23) position, the fluid flows through ports 295 and 296 into passage 282, thence through passages 283 and 284 into passage 147 which is connected directly to the chamber 149 of the direct speed cylinder 136. The stem 297 of valve V' is urged upwardly to open position by a spring 298'. A solenoid S', carried by a threaded fitting 299 which is threaded into a hole provided in the cover for receiving the same, has a plunger 300 having a reduced stem-like portion 301 depending therefrom. When the coil 302 of solenoid S' is energized, the plunger 300 moves downwardly and as the lower end of the stem 301 rests on the top of the valve stem 297, the latter is moved to closed position and the spring is compressed.

When valve V' is closed (Fig. 24) the stem cuts off communication between ports 295 and 296 and establishes communication between ports 296 and 303. Port 303 connects with passage 285 which drains into the casing.

Passage 286 (Figs. 10, 14 and 15) is disposed in the main casing 89 and is parallel to and below passage 282, and connects with a passage 287 which leads to the chamber of a valve V, and to a passage 293 which furnishes lubricating fluid to the transmission lubricating system. The valve V is similar to the valve V' and controls operation of the overdrive brake operating motor. The passage 287 connects with the valve V through a passage 288 (Fig. 15) and the system of porting in valve V is arranged in identical manner to that in valve V', the passage 288 being connected through passage 289 with passages 290 and 291 (which connects by way of passage 247 with the chamber 246) when the valve is in open (Fig. 23) position, and the passage 289 being connected to drain passage 292 when the valve is in its closed (Fig. 24) position.

Valve V is controlled by a solenoid S which has a plunger stem 304 adapted to engage a valve stem 305 for moving the latter to closed position against the spring 306.

Between passages 286 and 293 is disposed a valve 307 which serves as the main pressure regulating valve of the system. The valve 307 has a plunger 308 which is urged by a spring 309 to a position cutting off communication between passages 286 and 293. A threaded fitting 310 permits adjustment or replacement of spring 309. The spring 309 is preferably of 40 pounds pressure thereby maintaining a fluid pressure of 40 pounds in the piston actuating part of the system.

A lubrication pressure regulating valve 311 having a plunger 313 urged to cut-off position by a spring 312 is disposed adjacent the valve 307. The valve 311 opens the passage 293 to a drain passage 295 after a pressure of approximately 6 pounds has been attained in passage 293.

The passages 291 and 293 are connected respectively with the passages 247 and 294 by suitable passages (not shown) provided in the adapter plate 208.

Referring now mainly to Fig. 35, it may be seen that the vehicle ignition switch 314, which is connected in the usual manner to the vehicle battery (the opposite pole of which is grounded to the frame), is connected through a wire 315 with one side of a switch 316. The latter (shown also in Figs. 10 and 14) has a plunger 317 which is adapted to rest on a bump 318 formed on the low-reverse shifter yoke 120 when the latter is in neutral position to thereby maintain the switch open. When the yoke 120 is moved forwardly or rearwardly from neutral to shift the transmission into low or reverse speed, a coil spring 319 closes the switch 316. The other side of the switch is connected through wire 320 with one side of the field coil of solenoid S, the other side thereof being grounded through wire 321.

The solenoid S is also adapted to be energized by the governor switch G through wires 322, 323, 324 and 325, and by kickdown switch 77 through wires 322 and 325. The switches 316, G and 77 are connected in parallel and the purpose of each will be presently made clear.

The ignition switch 314 is also connected to one side of a switch 326 through a wire 327. The switch 326 has a plunger 328 which rests on the second-direct rail 113. The latter has a reduced portion 329 which permits the spring 330 to maintain the switch closed when the rail is in neutral and non-free wheeling second position. In all positions except these the switch is open. When the rail 113 is shifted into direct drive position the plunger 328 is thrust upwardly by the full-size portion of the rail and the switch is opened. The other side of the switch 326 is connected to solenoid S' through a wire 331, the other side of the solenoid being connected to ground at 332.

Solenoid S' may also be energized by governor switch G' through wires 327, 333, 334 and 335, and by a switch 336 through wires 327, 333 and 337. The latter switch is adapted for operation by the clutch pedal 84 and energizes the solenoid S' when the pedal is depressed.

The operation of the transmission as a whole will now be described.

Let it be assumed that the vehicle is at rest with the engine A idling and the manually shiftable lever 173 in neutral position. Under such conditions the sleeve Q will be positioned as illustrated in Figs. 9, 28 and 29 and the overdrive sun gear brake elements 230 will be in their free position with the teeth 228 of the sleeve 227 in mesh with the teeth 229 of the planetary carrier 212. Inasmuch as both shift rails 113 and 120 are in neutral position, switch 326 will be closed thereby causing solenoid S' to be energized which maintains valve V' in such a position that the fluid discharged from pump P through passage 137 is prevented from entering the passage 147 which leads to the chamber 149 of the direct speed motor. Under these conditions the governor switch G' is also closed because there is no rotation of annulus gear 217, and the solenoid S' may also receive current through wires 334, 335. Switch 316 is open because the stem 317 thereof is engaged by the bump 318 of the shift yoke 120 but solenoid S is energized by means of the governor switch G which is closed at this time along with the governor switch G'. Thus valve V is closed and pressure fluid is prevented from entering passage 289 which leads to pressure chamber 246 of the overdrive control motor. It may thus be seen that the pressure fluid flowing from the pressure side of the pump P during neutral setting of the transmission provides lubrication for the transmission parts only, the lubrication fluid flowing through the passage 286 and through the valve 307, the plunger 308 thereof being backed up against the pressure of the spring 309 to permit the fluid to flow into the passages 293 and 294, the latter of which connects with a pipe 340 at the rear of the transmission casing (Fig. 9). The pipe 340 also connects with a slip ring 341 which has a plurality of holes communicating with a passage 342 which leads into a bore 343 in the tail shaft 103. The bore 343 is connected with the bore 344 of the shaft 93 by means of a short connection conduit 345. Thus, it may be seen that lubricant may flow through the various passages, pipes and connections into the bores 343 and 344 where it is distributed to suitable lubrication passages such as 345 to the various parts of the transmission.

Reverse speed ratio setting of the transmission may be obtained by first depressing clutch pedal 84 which closes switch 336 and breaks the drive between the engine A and the transmission underdrive unit D by releasing the clutch disc 82 through operation of the release mechanism 85, 86 (Fig. 8). Closing of the switch 336 serves no useful purpose under conditions now being described, the switch 336 being provided to facilitate a shift down in transmission ratio which will be hereinafter more fully described. The manually shiftable lever 173 may now be rocked upwardly of the steering column to disengage shift finger 142 from its normal engagement with the slot 143 of shift yoke 140 and engage it in slot 170 of shift yoke 151 and swung away from the driver whereupon shift yoke 151 and rail 130 will be moved rearwardly of the transmission casing thereby meshing gear 119 with gears 108' and 118. At the same time switch 316 will be permitted to close under the action of spring 319 thereby providing energization for the solenoid S during the time that the vehicle is travelling in reverse. Unless some means for maintaining solenoid S energized during reverse driving was provided, the overdrive sun gear brake would be set by action of the pressure fluid caused by operation of the governor switch G if the vehicle were driven at a sufficiently high speed in reverse. Should the sun gear brake be set under such conditions, an excessive torque load would be imposed thereon because of the extremely low driving ratio of the reverse gear train, such an occurrence being undesirable and liable to cause slippage of the brake elements. Engagement of the clutch C will then permit the vehicle to be driven in reverse at any speed desired, the hydraulic control circuit being maintained in such condition during reverse driving that neither the overdrive brake motor nor the direct speed shift motor can receive pressure fluid.

Emergency low speed setting of the transmission is obtained in a manner similar to that described above for obtaining reverse setting except that the lever 173 is swung toward the driver while being held in its upper path of movement, which action shifts the yoke 151 and rail 130 forwardly of the transmission casing to engage gear 119 with countershaft driving gear 108. Engagement of clutch C will now cause the vehicle to be driven in emergency low speed ratio, the switches 326 and 316 being closed, thereby maintaining solenoids S and S' energized which in turn maintains valves V' and V in closed position.

It is contemplated that emergency low speed setting of the transmission will not be used during ordinary driving of the vehicle because normal low speed setting provides a ratio sufficiently low for starting under all ordinary conditions. However, the emergency low speed gear (which provides an over-all driving ratio of approximately 11 to 1 with a 4.3 axle) is provided for use in instances where an extremely low speed driving ratio is necessary such as when starting up a steep grade with the vehicle loaded or when pulling out of sand pits, etc.

Free-wheeling-second speed setting of the transmission (which is the starting speed ratio for all normal starts) is obtained by first depressing clutch pedal 84 and then swinging the manually shiftable lever 173 toward the driver while said lever is in its lower path of movement with the finger 142 engaged in the slot 143 of shift yoke 140 as illustrated in Figs. 10 and 14 which effects shift of yoke 140 and rail 113 forwardly of the transmission casing to cause sleeve Q to be shifted forwardly to the limit of movement provided by the rod 144 which engages the forward surface of the yoke 140 when the sleeve Q reaches free-wheeling-second speed position. The sleeve Q is now in such position that the teeth 102 thereof are positioned as shown in Fig. 30 and the control finger 124' of free-wheel cage 121 has moved clockwise under the influence of the spring 123' sufficiently to permit the rollers 120A to engage the outer cylindrical surface of the portion 118 of gear 109 and the leading surface of the cams 119. The piston 135 has also moved forwardly in cylinder 136 a distance equal to the forward movement of the sleeve Q, the said piston having a follow-up action during the shift of the sleeve Q from neutral to free-wheeling-second speed position. During the movement of the yoke 140 and rail 113 to free-wheeling second speed position, the cam portion 329 of the rail engages the plunger 328 of the switch 326 and opens the switch. This has no immediate effect on the solenoid S', the field coil of which still receives current through the governor switch G'.

Engagement of clutch C then causes the vehicle to be driven forwardly in free-wheeling-second speed position which provides an over all ration of 6.66 to 1, the drive being transmitted from the motor A through fluid coupling B and clutch C, shaft 83, pinion 90, gears 96, 106 and 109, overrunning clutch F, hub 104, shaft 93, planetary gearset being locked up in 1 to 1 ratio under such conditions because of the engagement of the teeth 228 and 229 which lock the carrier 212 and sun gear 216 together.

The vehicle may be accelerated in free-wheeling-second speed ratio drive to a speed of approximately 10 M. P. H. which is the operating speed of the overdrive governor control switch G when an up-shift is being made. It is, of course, understood that switch 316 remains open at all times except when the transmission is set for reverse or emergency low speed ratio drive and that the kickdown switch 77 is open at all times except when the accelerator pedal 59 reaches its overtravel position and thereafter remains closed until the accelerator pedal is released a degree sufficient to enable the finger 74 of the switch control lever 73 to open the switch. It may therefore be seen that the solenoid S may be deenergized only through the action of the governor switch G when the transmission is set for free-wheeling-second-speed ratio drive with the accelerator pedal positioned within its normal throttle operating range of movement.

When the vehicle reaches a speed of approximately 10 M. P. H., governor switch G opens thereupon deenergizing solenoid S and permitting the spring 298 to return the valve stem 305 of the valve V to valve open position. Pressure fluid from pump P may now enter the passage 289 which leads to passage 247 through valve V. Chamber 246 of the overdrive brake operating motor thereupon rapidly fills up and piston 240 moves forwardly in the cylinder 244 thereby carrying brake elements 233 and sleeve 226 forwardly to disengage the teeth 228 from the teeth 229 and cause the brake elements 230 to be engaged by the friction brake shoes 232, thereby stopping the sun gear 216 from forward rotation.

This effects shift of the transmission into third speed position which provides an over all driving ratio of 4.62 to 1, the tail shaft 103 now being driven at an overspeed with respect to the shaft 93 through carrier 212, planet gears 215 and annulus gear 211. It should be noted that the shift from second speed ratio drive to third speed ratio drive (which corresponds to a shift from first to second speed in conventional transmissions) is obtained while the vehicle is driving and without necessitating any interruption of the drive by disengagement of the clutch C, interruption of the engine ignition or by other means. The vehicle may now be accelerated in third speed ratio to approximately 20 M. P. H. whereupon the governor switch G' which governs the action of the piston 135 opens.

Opening of the governor switch G' deenergizes solenoid S' and permits the spring 298' of the valve V' to return the valve stem 297 to Fig. 23 position whereupon fluid from pump P enters the passage 147 through the valve V' and fills the chamber 149 of the cylinder 136. Piston 135 thereupon moves forwardly in the cylinder 136 to the limit of movement provided by the slot 133 in rail 113 and compresses springs 138 and 146. So long as drive is maintained on the shaft 83, sleeve Q may only shift forwardly sufficiently for the short teeth 102' thereof to engage the short blocker teeth 116. This is the previously described drive block position of the sleeve Q illustrated in Fig. 32.

Release of the vehicle accelerator pedal to thereby relieve the torque on shaft 83 will permit the engine A to drop to idle speed thereby causing a sharp drop in the speed of the shaft 83, the shaft 93 and the other associated transmission mechanism overrunning the shaft 83, gears 109, 106 and 96 and the pinion 90 through the action of the overrunning clutch F. When the speed of the pinion 90 drops to the speed of the shaft 93 and slightly below the speed of the shaft 93, the blocker member 114 will move counterclockwise relative to the hub 104 to the limit of movement permitted by the movement of the lug 127' in the slot 126' thereupon causing the blocker teeth 116 to slide out of blocking position relative to the sleeve teeth 102' and permit the sleeve teeth 102' and 102 to pass through the blocker and into engagement with the clutch teeth 101 and shift of the sleeve Q is rapidly and positively accomplished upon unblocking of the sleeve by the action of the springs 138 and 146 which were previously compressed by forward movement of the piston 135.

Depression of the accelerator pedal will now cause the vehicle to be driven forwardly in fouth speed position at an over all speed ratio of 3 to 1, the shaft 93 being driven at the same speed as the shaft 83 and the tail shaft 103 being driven at an overspeed with respect to shafts 93 and 83. This is the normal cruising speed ratio setting of the transmission and provides good acceleration combined with low engine R. P. M. and maximum economy.

Should greater acceleration be necessary to meet emergency conditions encountered during driving such as when passing cars on hills, etc., an immediate return to third speed ratio setting or direct drive position may be obtained by manipulation of the kickdown mechanism. This is accomplished by the driver actuating the accelerator pedal 59 into its kickdown range of movement beyond wide open throttle position whereupon the throttle control lever 57 engages the stop 58 and the rod 64 travels forwardly in the bore 67 of the lost motion connection mechanism T compressing the spring 69 and engaging the finger 75 of the switch operating lever 73 with the switch operating finger of the switch 77. Kickdown switch 77 is thereupon closed and solenoid S is energized through wires 315, 322 and 325 thereby causing movement of the valve stem 305 of the valve V from its Fig. 23 open position to its Fig. 24 closed position. This cuts off the flow of pressure fluid from passage 288 into passage 289 and opens passage 289 to drain passage 292. Cylinder 243 is therefore rapidly evacuated and brake elements 230 are separated from brake shoes 232 under the action of springs 236, 237 and 248 (Figs. 9A and 9B) which also thrust sleeve 227 rearwardly to mesh teeth 228 and 229.

Upon release of the brake elements 230, the driving ratio of the transmission is immediately shifted downwardly from fourth speed driving ratio to third speed driving ratio (4.3 to 1) and the drive between shafts 93 and 103 is transmitted through the planetary gearset with the carrier 212 locked to the sun gear 216 through the teeth 228 and 229. It frequently happens that due to the difference in speed between the carrier 212 and the sun gear 216 at the instant of release of the brake elements 230 and rearward shift of the sleeve 227, the teeth 228 will not engage with the teeth 229. Under such conditions the direct drive is immediately established through the overrunning clutch H, the rollers 221 of which wedge between the cams 220 of the carrier 212 and the inner cylindrical surface 222 of the annulus gear extension 218. Thus it may be seen that failure of the teeth 228 and 229 to mesh will not cause loss of drive between the shafts 93 and 103. The sleeve 226 is, of course, continuously urged rearwardly by the springs 236—237, 248 and 249 and the teeth 228 and 229 will be meshed automatically whenever they line up in non-interfering position. The teeth 228 and 229 are of the well-known Maybach type and the sleeve 226 will exert a slight camming action to mesh the teeth under favorable conditions. It is not necessary that the teeth 228 and 229 be meshed during forward driving of the vehicle because forward drive will always be transmitted through the rollers 221 of the overrunning clutch H. During reverse driving of the transmission and when it is desired to use the engine A as a brake for descending grades, it is necessary that the teeth 228 and 229 be meshed in order that a two-way drive may be transmitted between the shafts 93 and 103. It has been found by experience that the sleeve 226 will move rearwardly to mesh the teeth 228 and 229 whenever the transmission is brought to neutral or during shifting of any of the gears while the cylinder 243 is without pressure.

Return from kickdown position to fourth speed driving position may be obtained at any time by release of the accelerator pedal 59 sufficiently to permit it to be returned by the spring 62 to idle position whereupon the finger 74 of the lever 73 will engage the switch operating finger 76 of the kickdown switch 77 and return said switch to open position whereupon solenoid S will be de-energized and spring 298 will open valve V and restore pressure on piston 240. It is assumed, of course, that the vehicle is still travelling at a speed above the critical operating speeds of governor switches G and G'.

When the vehicle speed is reduced, as when coming to a stop, governor switch G' will close at a speed somewhere in the neighborhood of 12 M. P. H. thereby venting the cylinder 136. However, the sleeve Q will be retained in its direct drive position because of the frictional load caused by torque transmission through the teeth 101, 102 and 102' until the vehicle reaches a very low speed at which time the spring 138 which acts between the piston 135 and the rear surface of the yoke 140 will move the piston 135 and rail 113 rearwardly to the limit of movement permitted by engagement of the shift yoke portion 141 with the portion 140 thereby disengaging the sleeve Q from the clutch teeth 101 and returning the sleeve Q to free-wheeling-second speed position.

The planetary gearset will remain in overdrive position until the speed of the vehicle is further reduced to approximately 5 M. P. H. whereupon the governor switch G will close, energizing solenoid S and causing operation of the valve V to vent the cylinder 243 whereupon the brake elements 230 will be released and 1 to 1 ratio drive will be established between the shafts 93 and 103 either through the teeth 228 and 229 or the overrunning clutch H. The vehicle is now in free-wheeling-second speed position with the planetary gearing positioned for 1 to 1 ratio drive and the vehicle is ready for a start in its normal first speed ratio or for idling with the transmission in gear, it not being necessary to disengage the manually operable clutch C except when shifting the rails 113 and 130 to or from neutral position.

It may therefore be seen that during normal operation of the vehicle, the manually operable gear shift lever 173 may be left in its free-wheeling-second speed position (which corresponds to high speed position in conventional transmissions) and the vehicle may be driven simply by manipulating the accelerator pedal 59 and the brake pedal of the vehicle (not shown), the gear shift taking place under control of the driver without the necessity of manipulating either the lever 173 or the clutch pedal 84.

Should it be desired to drive the vehicle in second speed position for a considerable length of time without shift of the sleeve Q to direct position and without free-wheeling, as for example when descending long, steep grades or when it is desired to drive the vehicle in a relatively low gear ratio as when traversing snowy roads, etc., the manually operable lever 173 may be shifted away from the driver in its lower path of movement to engage the sleeve Q with the clutch teeth 110 formed on the gear 109. While the rail 113 is in this non-free-wheeling second speed ratio position, switch 326 remains closed and therefore solenoid S' will remain energized at all times making it impossible for cylinder 136 to receive pressure. So long as the vehicle is operated at a speed below 10 M. P. H., the vehicle will be driven in a speed ratio of 6.66 to 1 and two-way drive will be transmitted between the shafts 83, 93 and 103, the overrunning clutch F having been cut out by engagement of the sleeve Q with the clutch teeth 110 and the overrunning clutch H having been cut out by engagement of the teeth 228, 229 under the action of the spring 249 during neutral setting of the transmission. If, under such driving conditions, a speed of 10 M. P. H. is reached, then the solenoid S will be deenergized and the overdrive control cylinder 243 will receive pressure fluid and a shift to third speed (4.62 to 1 ratio) will be obtained. However, it is to be noted that this is also a two-way drive. Thus the same safety conditions will prevail in third speed as in second.

During operation of the vehicle in emergency low speed ratio or in reverse ratio, a two-way drive is obtained because overrunning clutches F and H are inoperative under these conditions and in addition both solenoids S' and S are maintained in energized condition through the action of the switches 326 and 316 so that the automatic functioning of the transmission is inoperative.

Shift from non-free-wheeling-second speed ratio setting to free-wheeling-second-speed ratio setting may be obtained at any time during driving of the vehicle in non-free-wheeling speed ratio setting by depression of the clutch pedal 84 and movement of the manually operable lever 173 from its non-free-wheeling-second speed ratio position to its free-wheeling-second speed ratio position and release of the clutch pedal 84 whereupon shift of sleeve Q to direct drive position will be obtained automatically through the action of the governor switch G'.

It may thus be seen that we have provided a transmission for driving a motor vehicle which combines all of the advantages of the conventional three speed and reverse transmission and automatic transmission. Selective control is provided which permits the vehicle driver to select any desired speed ratio or driving condition and the transmission remains under positive control of the driver at all times regardless of whether it is positioned for automatic or manual operation.

Our transmission is particularly advantageous for driving under city conditions because it provides automatically, after the manually operable gear shift lever has once been set for forward travel, an upshift during driving by the action of the governor switch G and a second upshift upon coast of the vehicle by the action of the governor switch mechanism G'. Such a combination of shifting functions is particularly pleasing to the driver because it permits him to control the time at which the final shift to cruising speed ratio will be made. For example, the shift from free-wheeling-second speed ratio to third speed ratio is made at approximately 10 M. P. H. during driving of the vehicle without any attention on the part of the driver thereof but the shift from third speed driving ratio to fourth or cruising ratio may be made at any speed above 20 M. P. H. depending upon the speed at which the accelerator pedal is released to permit synchronization of the shafts 83 and 93. It is therefore apparent that when exceptional acceleration is desired, the driver may obtain it through natural depression of the accelerator pedal which causes the vehicle to be started from rest in 6.66 to 1 starting ratio which provides a fast start and when the vehicle has accelerated to a speed of 10 M. P. H., operation of the governor switch mechanism G will effect an automatic shift to 4.62 to 1 ratio without interruption of the drive or loss of momentum. The driver may then continue acceleration of the car in this 4.62 to 1 ratio as long as he desires, a shift from third speed driving ratio to fourth speed or 3 to 1 ratio taking place only upon release of the accelerator pedal while the vehicle is travelling at a speed in excess of 20 M. P. H.

After the vehicle has been shifted to fourth speed or cruising ratio, return to third speed may be made at any time by a kickdown operation of the accelerator pedal and acceleration of the vehicle in this kickdown gear position may be continued as long as desired, the return to cruising speed ratio being obtained simply by release of the accelerator pedal. Due to the fact that kickdown of the transmission is obtained without interruption of the drive, an exceptionally smooth and fast kickdown operation of the transmission is obtained. This permits drive of the vehicle under both country driving and city driving conditions in a relatively fast ratio (3 to 1) which permits maximum economy, the fast acceleration necessary for maneuvering in city traffic being obtained by kickdown operation of the accelerator pedal.

The kickdown function of the transmission is also available during drive of the vehicle in both free-wheeling-second-speed position and non-free-wheeling-second-speed position. This feature makes it possible for the driver to drive the vehicle at speeds in excess of 10 M. P. H. in 4.62 to 1 speed ratio and to immediately effect a return to 6.66 to 1 speed ratio by manipulation of the accelerator pedal into its overtravel range of movement. This is an important advantage in that it provides positive and flexible control of speed ratios under all conditions of vehicle drive.

Another important feature of the invention resides in the novel valve arrangement, particularly that of the restriction valve 94. Referring to Figs. 25 and 35, it will be seen that the valve 94 is positioned in the hydraulic circuit between the valves V and V', and functions to prevent loss of pressure in one of the motor supply branches during the period that the other motor supply branch is filling.

For example, let it be assumed that the vehicle is being driven in third speed ratio (4.62 to 1). Under such conditions, valve V is open and pressure is on in the overdrive control cylinder 244, the spring 309 of valve 307 acting to maintain the fluid pressure at sufficient value to prevent slippage of the brake elements 230. In the present embodiment, the valve 307 is set to maintain a pressure of 40 pounds per square inch which is more than sufficient to hold the brake elements 230 under the torque conditions existing during driving with the sleeve Q in underdrive position. The pressure delivered by pump P is of course sufficient at all times during normal driving to move the plunger 308 off its seat and supply pressure to passages 293 and 294 for lubrication of the transmission, the valve 311 acting to maintain a pressure of approximately 6 pounds per square inch in these passages.

When, during driving under the aforesaid conditions, a speed of approximately 20 M. P. H. is reached, solenoid S' is deenergized and valve V' opens to permit pressure fluid to flow into passage 147 and chamber 149 of cylinder 136. During the time that the aforesaid passage and chamber are filling the pressure in the entire system would drop to zero if some regulating means was not provided. If the pressure were permitted to drop to zero, or to some value below that necessary to hold the sun gear 216 against rotation, slippage of brake elements 230 would occur. Such a contingency is prevented by the restriction valve 94. The spring 95 thereof is set to maintain a pressure of 30 pounds per square inch in the supply passages, therefore, the pressure on piston 240 will not drop below 30 pounds during operation of the piston 135. A pressure of 30 pounds per square inch is sufficient to hold the sun gear under all normal driving conditions (the switch 316 preventing energization of cylinder 244 during driving in emergency low and reverse ratios when abnormally high torque is sometimes required) thus it may be seen that the shift from third speed ratio to high speed ratio is accomplished without roughness or shock due to fluctuating pressure in the hydraulic system.

When both the cylinder 244 and the cylinder 136 are energized, the passage 148 is also open, the spring 138 being of such strength that it tends to maintain a pressure of 40 pounds in the system. It is apparent that the control springs 138 and 309 should function to maintain approximately equal pressure in order that the lubricating passage 293 will receive pressure and the pump P will not be required to supply higher pressures than are required for proper operation of the transmission.

The valve 94 functions in a manner similar to that just described during the kickdown operation. Upon closing of the kickdown switch 77 during cruising of the vehicle in 3 to 1 ratio, the solenoid S is deenergized and cylinder 244 is vented through passage 292. The vehicle is then driven in the kickdown ratio of 4.3 to 1, the shafts 83, 93 and 103 all being connected for direct drive therebetween. Upon a return to the 3 to 1 cruising ratio, valve V is opened and pressure fluid flows into cylinder 244. If it were not for valve 94, the pressure behind piston 135 would drop to zero while cylinder 244 is being filled and although sleeve Q probably would be held in engaged position by the frictional load on the teeth thereof, a release of driving torque at this time would cause the sleeve to wholly or partially disengage and damage to the parts might occur upon build-up of pressure in chamber 149.

It may thus be seen that the valve 94 performs an important and novel function in the operation of the transmission.

Having thus described the preferred embodiment of our invention, we wish to point out that by so doing, we do not wish to limit the same in any way, shape or form, except as defined by the scope of the claims appended hereto.

We claim:

1. In a power transmission for motor vehicles having a plurality of shift members adapted for shifting by respective fluid actuated means thereby to effect speed ratio changes in said transmission, control means operably associated with said respective fluid actuated means for effecting operation of the latter to shift said shiftable members said control means including vehicle speed responsive means to operate said fluid actuated means in sequence and at predetermined vehicle speeds, a source of pressure fluid; conduits connecting said source with said respective fluid actuated means; and pressure regulating means in the conduit supplying one of said fluid actuated means for maintaining a predetermined minimum pressure in the conduit supplying the other of said fluid actuated means during operation of said first mentioned one whereby to prevent failure of other of said fluid actuated means.

2. In a power transmission for motor vehicles, a pair of shiftable members; fluid actuated motors respectively associated with said members for shifting the same to thereby effect speed ratio changes in said transmission; a pump for supplying pressure fluid to said motors; a pair of valves connected respectively between said motors and said pump vehicle speed responsive; means for effecting sequential operation of said valves thereby to effect sequential shifting of said members; conduits connecting said pump, valves and motors arranged such that said motors are retained in their shifted positions by fluid pressure supplied by said pump; and pressure regulating means operatively connected in the conduit supplying one of said fluid motors for maintaining a predetermined minimum fluid pressure in the conduit supplying the other of said pair of motors during operation of the said first mentioned one whereby to prevent failure of the other motor.

3. In a power transmission for motor vehicles, a pair of shiftable members; fluid actuated motors respectively associated with said members for shifting the same to thereby effect speed ratio changes in said transmission; a pump for supplying pressure fluid to said motors; a pair of valves connected respectively between said motors and said pump; vehicle speed responsive means for effecting sequential operation of said valves thereby to effect sequential shifting of said members; conduits connecting said pump, valves and motors arranged such that said motors are retained in their shifted positions by fluid pressure supplied by said pump; and means comprising a spring loaded valve operatively connected in the conduit supplying one of said fluid motors for maintaining a predetermined minimum fluid pressure in the conduit supplying the other of said pair of motors during operation of the said first mentioned one whereby to prevent failure of the other motor.

4. In a power transmission for motor vehicles, first and second shiftable members; first and second fluid pressure actuated motors respectively associated with said members for shifting the same to thereby effect speed ratio changes in said transmission; a pump for supplying pressure fluid to said motors; first and second control valves respectively connected between said motors and said pump for controlling operation of said motors; a system of conduits connecting said pump, said valves and motors arranged such that said motors are retained in their shifted positions by fluid pressure supplied by said pump; means for controlling operation of said valves including vehicle speed responsive means for causing operation of either of said motors while the other is in its shifted position; said system including pressure regulating means connected in the conduit supplying said first fluid motor for maintaining predetermined minimum fluid pressure in the conduit supplying the second fluid motor during operation of the first motor while the second fluid motor is in shifted position to thereby prevent failure of the second fluid motor.

5. In a power transmission for motor vehicles, first and second shiftable members; first and second fluid pressure actuated motors respectively associated with said members for shifting the same to thereby effect speed ratio changes in said transmission; a pump for supplying pressure fluid to said motors; first and second control valves respectively connected between said motors and said pump for controlling operation of said motors; a system of conduits connecting said pump, said valves and motors arranged such that said motors are retained in their shifted positions by fluid pressure supplied by said pump; means for controlling operation of said valves including vehicle speed responsive means for causing operation of either of said motors while the other is in its shifted position; and a spring loaded valve means connected in said system for maintaining constant predetermined minimum pressure on both said control valves during operation of one of said motors when the second is in shifted position to thereby prevent failure of the latter motor.

6. In a power transmission for motor vehicles, first and second shiftable members; first and second fluid pressure actuated motors respectively associated with said members for shifting the same to thereby effect speed ratio changes in said transmission; a pump for supplying pressure fluid to said motors; first and second control valves respectively connected between said motors and said pump for controlling operation of said motors; a system of conduits connecting said pump, valves and motors arranged such that said motors are retained in their shifted positions by fluid pressure supplied by said pump; means for controlling operation of said valves including means for causing operation of either of said motors while the other is in its shifted position; a check valve connected in said system for regulating the maximum fluid pressure therein; and a second check valve connected in said system between said control valves for maintaining predetermined minimum fluid pressure in the conduit supplying one of said motors when in shifted position during shifting operation of the other motor.

7. In a power transmission for motor vehicles first and second shiftable members; first and second fluid pressure actuated motors respectively associated with said members for shifting the same to thereby effect speed ratio changes in said transmission; a pump for supplying pressure fluid to said motors; first and second control valves respectively connected between said motors and said pump for controlling admission of pressure fluid to said motors, a system of conduits connecting said pump, valves and motors arranged such that said motors are retained in their shifted positions by fluid pressure supplied by said pump; vehicle speed responsive means for effecting sequential operation of said control valves and motors to thereby effect sequential shifting of said members; pressure regulating means in said system for regulating the maximum fluid pressure therein and a second pressure regulating means in the conduit supplying the first of said motors for maintaining a predetermined minimum fluid pressure in the conduit of the second motor when in shifted position which pressure is less than the maximum pressure established by said first mentioned pressure regulating means whereby to prevent failure of said second motor during shifting operation of said first motor.

8. In a power transmission for motor vehicles, a plurality of shiftable members each having a fluid actuated motor associated therewith for shifting the same to thereby effect speed ratio changes in said transmission, a pump for supplying pressure fluid to operate said motors and to lubricate said transmission, a valve arranged between each of said motors and said pump for effecting operation of said motors, speed responsive means associated with said valves for effecting operation of said motors in sequence at predetermined vehicle speeds, a system of conduits connecting said pump, valves and motors and for conveying fluid for lubrication, pressure regulating means in said system for regulating the maximum fluid pressure therein, a second pressure regulating means in the conduit supplying one of said motors for maintaining a predetermined minimum fluid pressure in the conduit supplying the other motors when one of said other motors is in shifted position, which pressure is less than the maximum pressure established by said first mentioned pressure regulating means whereby to prevent failure of said shifted motor during shifting operation of said first mentioned motor, and third pressure regulating means in series with said first regulating means for maintaining a predetermined minimum fluid pressure in the conduit for conveying fluid for lubrication which pressure is less than the pressure established by either of said other pressure regulating means.

CARL A. NERACHER.
WILLIAM T. DUNN.
AUGUSTIN J. SYROVY.
OTTO W. SCHOTZ.